(12) United States Patent
Nash et al.

(10) Patent No.: US 11,037,192 B1
(45) Date of Patent: *Jun. 15, 2021

(54) CORRELATING GEOGRAPHIC POSITIONS OF MOBILE DEVICES WITH CONFIRMED POINT-OF-SALE DEVICE TRANSACTIONS

(71) Applicant: Splunk Inc., San Francisco, CA (US)

(72) Inventors: Brian Gabriel Nash, Seattle, WA (US); Andrew Hoy Stein, Carlsbad, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,317

(22) Filed: Jul. 30, 2020

Related U.S. Application Data

(63) Continuation of application No. 16/669,156, filed on Oct. 30, 2019, now Pat. No. 10,776,818, which is a continuation of application No. 16/568,077, filed on Sep. 11, 2019, now Pat. No. 10,789,613, which is a continuation of application No. 16/126,294, filed on Sep. 10, 2018, now Pat. No. 10,482,493, which is a continuation of application No. 15/582,512, filed on Apr. 28, 2017, now Pat. No. 10,115,126.

(51) Int. Cl.
*H04W 4/02* (2018.01)
*G06Q 30/02* (2012.01)
*G01S 5/02* (2010.01)

(52) U.S. Cl.
CPC ........ *G06Q 30/0246* (2013.01); *G01S 5/0252* (2013.01); *G06Q 30/0205* (2013.01); *H04W 4/02* (2013.01)

(58) Field of Classification Search
CPC ....... H04W 4/028; H04W 4/02; H04W 4/021; H04W 4/023; H04W 4/027; H04W 4/06; H04W 48/10; H04W 4/008; H04W 4/043; G06Q 20/20; G06Q 30/0246; G06Q 30/0205; G01S 5/0252

See application file for complete search history.

(56) References Cited

U.S. PATENT DOCUMENTS

| | | | |
|---|---|---|---|
| 6,389,403 B1 | 5/2002 | Dorak, Jr. | |
| 8,412,696 B2 | 4/2013 | Zhang et al. | |
| 8,589,375 B2 | 11/2013 | Zhang et al. | |
| 8,788,525 B2 | 7/2014 | Neels et al. | |
| 9,031,978 B1 | 5/2015 | Beresniewicz et al. | |
| 9,185,007 B2 | 11/2015 | Fletcher et al. | |

(Continued)

OTHER PUBLICATIONS

Diakun, J. et al., "Splunk Operational Intelligence Cookbook", Pakt Publishing 2014, pp. 1-523 [emphasis: pp. 177-376] (523 pages).
Lopez, Maribel, "Right-Time Experiences—Driving Revenue with Mobile and Big Data", Wiley & Sons Publishers 2014, pp. xi-141; 229-255 (188 pages).
Wirth, N. "Algorithms + Data Structures = Programs", Prentice Hall Series in Automatic Computation, 1976, pp. xii-55 (76 pages).

(Continued)

*Primary Examiner* — Jean A Gelin
(74) *Attorney, Agent, or Firm* — Ferguson Braswell Fraser Kubasta PC

(57) ABSTRACT

Embodiments are disclosed for a method that may include accessing events in a field-searchable data store. The events may include raw machine data associated with a timestamp. The raw machine data may represent interactions between a mobile device and one or more network devices at a locale. The method may further include determining, based on the interactions, one or more geographic positions of the mobile device, and calculating a metric for the locale using the geographic positions.

20 Claims, 19 Drawing Sheets

(56) References Cited

U.S. PATENT DOCUMENTS

| | | | |
|---|---|---|---|
| 9,875,481 | B2 | 1/2018 | Pradhan et al. |
| 10,169,751 | B2 | 1/2019 | Cummins et al. |
| 10,354,262 | B1* | 7/2019 | Hershey ............... H04L 67/306 |
| 2008/0082424 | A1 | 4/2008 | Walton |
| 2008/0281687 | A1 | 11/2008 | Hurwitz et al. |
| 2012/0030006 | A1 | 2/2012 | Yoder et al. |
| 2012/0271715 | A1* | 10/2012 | Morton ............... G06Q 30/0257 705/14.53 |
| 2013/0027561 | A1* | 1/2013 | Lee ................... G06K 9/00302 348/150 |
| 2013/0041775 | A1 | 2/2013 | Rosenberg |
| 2013/0179201 | A1 | 7/2013 | Fuerstenberg et al. |
| 2014/0019450 | A1 | 1/2014 | Rus et al. |
| 2014/0363059 | A1 | 12/2014 | Hurewitz |
| 2014/0365334 | A1 | 12/2014 | Hurewitz |
| 2015/0019537 | A1 | 1/2015 | Neels et al. |
| 2015/0208196 | A1 | 7/2015 | Nigam |
| 2015/0262232 | A1 | 9/2015 | Klein et al. |
| 2015/0332275 | A1 | 11/2015 | Prodam et al. |
| 2015/0347562 | A1 | 12/2015 | Guedalia et al. |
| 2016/0055225 | A1 | 2/2016 | Xu et al. |
| 2016/0086191 | A1 | 3/2016 | Fonzi et al. |
| 2016/0112822 | A1 | 4/2016 | Giral et al. |
| 2016/0162870 | A1 | 6/2016 | Henson et al. |
| 2016/0239024 | A1 | 8/2016 | Fletcher et al. |
| 2017/0011449 | A1 | 1/2017 | Mueller et al. |
| 2017/0094588 | A1 | 3/2017 | Naqvi |
| 2019/0312941 | A1* | 10/2019 | Maccini ............... G06F 16/2365 |

OTHER PUBLICATIONS

Park, J.J. et al., "IT Convergence and Services", Proceedings of the International Conference on Information Technology Convergence and Services (ITCS) 2011, and Intelligent Robotics, Automations, telecommunications facilities, and applications (IRoA) 2011, pp. 439-442 (8 pages).

Marr, Bernard, "Big Data in Practice", Wiley & Sons Publishing 2016 (19 pages).

Van Dam, K.H. et al., "Agent-Based Modelling of Socio-Technical Systems", Springer 2013, pp. v-73 (97 pages).

Lakoff, G. et al., "Metaphors We Live by", University of Chicago Press, 1980, pp. 1x-55 (66 pages).

Edelman, Shimon, "Computing the Mind, How the Mind Really Works", Oxford University Press 2008, pp. xi-36 (51 pages).

Vermesan, O. et al., "Building the Hyperconnected Society—Internet of Things beyond the Hype: Research, Innovation and Deployment", River Publishers 2015, pp. 15-118, 221-260 (149 pages).

Tanner, John Jr., "Analytics and Dynamic Customer Stategy—Big Profits from Big Data", Wiley and Sons Publishers 2014, pp. xi-43 (64 pages).

Gupta, Naresh, "Inside Bluetooth Low Energy", Artech House Mobile Communications Series 2013, pp. 119-130 (111 pages).

Goffman, Erving, "Frame Analysis—an Essay on the Organization of Experience", Northeastern University Press, 1974, pp. 1-39; 301-344 (55 pages).

\* cited by examiner

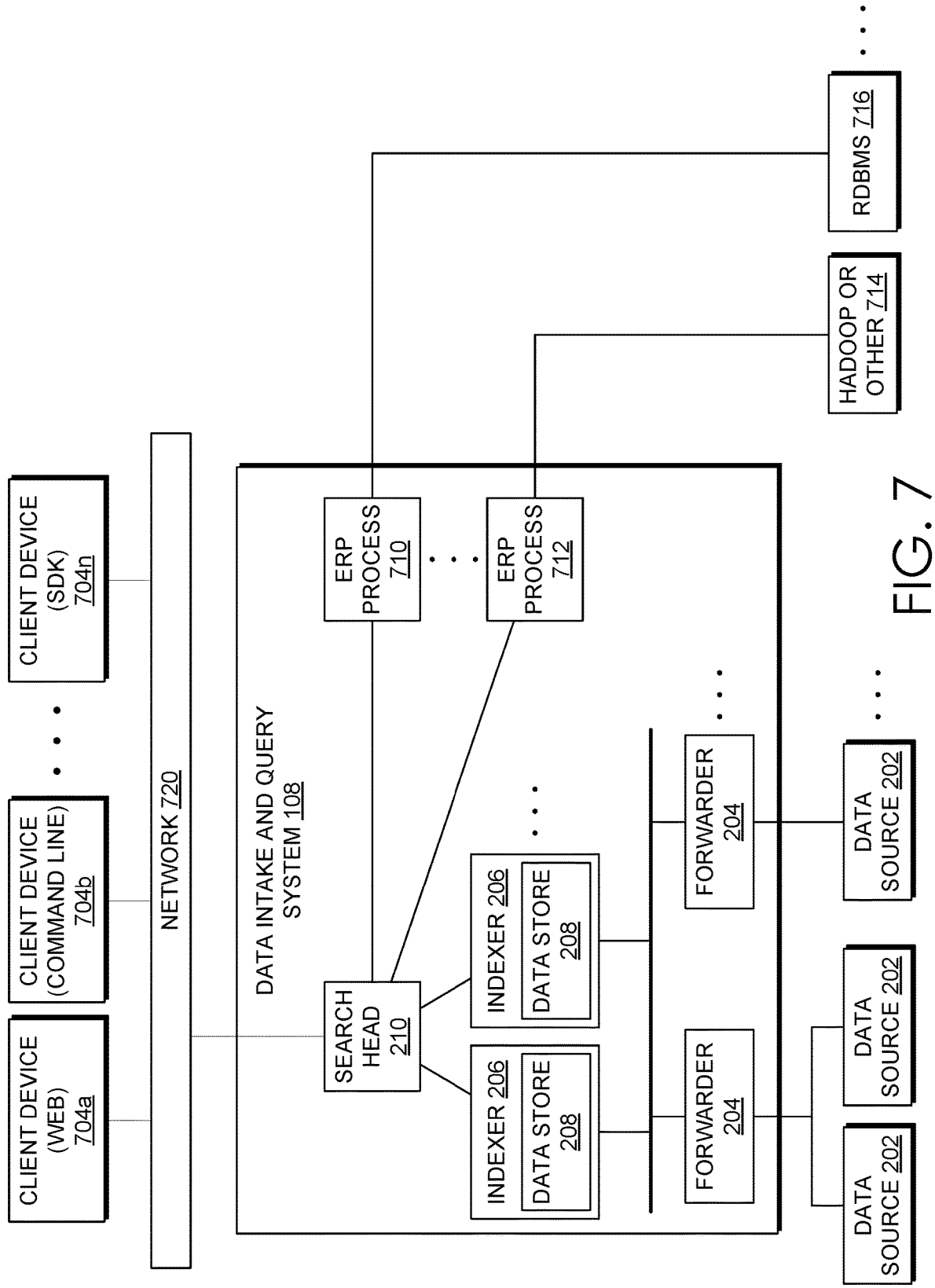

CORRELATING GEOGRAPHIC POSITIONS OF MOBILE DEVICES WITH CONFIRMED POINT-OF-SALE DEVICE TRANSACTIONS

CROSS-REFERENCE TO RELATED APPLICATIONS

The present application is a continuation application of and, thereby, claims benefit under 35 U.S.C. § 120 to U.S. application Ser. No. 16/669,156, entitled, "Identifying And Leveraging Patterns In Geographic Positions Of Mobile Devices," filed on Oct. 30, 2019, having the same inventors, and incorporated herein by reference. U.S. application Ser. No. 16/669,156 is a continuation application of and, thereby, claims benefit under 35 U.S.C. § 120 to U.S. application Ser. No. 16/568,077, entitled, "Correlating Geographic Positions With Completed Sales Transactions," filed on Sep. 11, 2019, having the same inventors, and incorporated herein by reference. U.S. application Ser. No. 16/568,077 is a continuation application of U.S. application Ser. No. 16/126,294 (U.S. Pat. No. 10,482,493), entitled, "Correlating Geographic Positions of Mobile Devices With Point-of-Sale Device Transactions," filed on Sep. 10, 2018, having the same inventors, and incorporated herein by reference. U.S. application Ser. No. 16/126,294 (U.S. Pat. No. 10,482,493) is a continuation application of U.S. application Ser. No. 15/582,512 (U.S. Pat. No. 10,115,126), entitled, "Leveraging Geographic Positions of Mobile Devices at a Locale," filed on Apr. 28, 2017, having the same inventors, and incorporated herein by reference. Accordingly, this application claims benefit under 35 U.S.C. § 120 to U.S. application Ser. Nos. 16/669,156, 16/568,077, 16/126,294 (U.S. Pat. No. 10,482,493), and Ser. No. 15/582,512 (U.S. Pat. No. 10,115,126).

BACKGROUND

Typical customer behavior analysis is performed by obtaining customer data directly (e.g., through marketing surveys, loyalty cards, and other programs). When a customer purchases goods, the purchases may be associated with the customer identifiers in a structured database. Techniques of big data analysis on the structured databases are performed to identify marketing targets, analyze demographic behaviors, and develop retail strategies. The use of one or more structured databases and gathering data directly has been an important tool in large data analysis. In particular, technological advances in big data analysis focuses on creating structured databases of information and then performing various data mining techniques on the structure databases.

BRIEF DESCRIPTION OF DRAWINGS

FIG. 7 illustrates a block diagram of an example data intake and query system that performs searches across external data systems in accordance with the disclosed embodiments.

DETAILED DESCRIPTION

Figure 1:
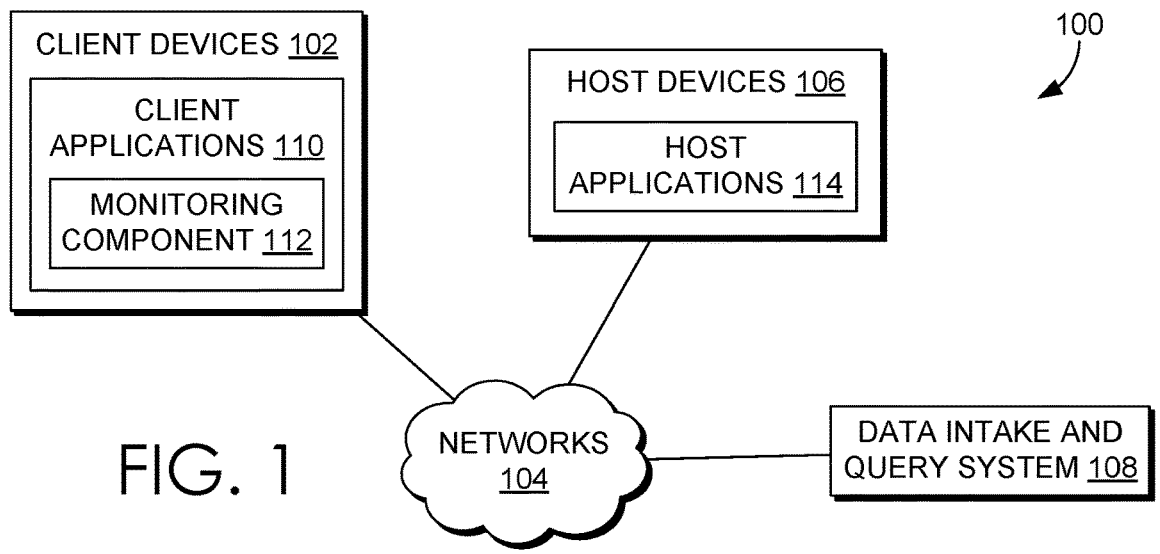
FIG. 1 illustrates a networked computer environment in which an embodiment may be implemented.

Embodiments are described herein according to the following outline:
1.0. General Overview
2.0. Operating Environment
  2.1. Host Devices
  2.2. Client Devices
  2.3. Client Device Applications
  2.4. Data Server System
  2.5. Data Ingestion
    2.5.1. Input
    2.5.2. Parsing
    2.5.3. Indexing
  2.6. Query Processing
  2.7. Field Extraction
  2.8. Cloud-Based System Overview
  2.9. Searching Externally Archived Data
    2.9.1. ERP Process Features
3.0. Geographic Positioning Subsystem
  3.1. Geographic Positioning Analyzer
  3.2. Geographic Positioning Methods
  3.3 Examples Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Executive Summary

In general, embodiments of the invention involve using raw machine data (e.g., wireless router logs) to determine a succession of geographic positions of customers in the vicinity of retail locales. Interactions between mobile devices of customers and network devices at the retail locale may be tracked and logged as the customers move within various zones of the retail locale. Using the geographic positions alone, or in combination with data from other sources (e.g., reward/loyalty systems, point-of-sale (POS) devices, inventory systems, sensors, promotion redemption systems, etc.), various metrics may be calculated and correlations may be performed to support powerful retail analytics. Examples of such metrics may include: waiting times at sales registers, walk-by sales conversion rates, amount of time spent at the retail locale, processing time to redeem promotions, etc. The various metrics may be used to predict and/or measure the operational impact of promotions.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system (100) in which an embodiment may be implemented. Those skilled in the art would understand that FIG. 1 represents one example of a networked computer system and other embodiments may use different arrangements.

The networked computer system (100) comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices (102) are coupled to one or more host devices (106) and a data intake and query system (108) via one or more networks (104). Networks (104) broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system (100) includes one or more host devices (106). Host devices (106) may broadly include any number of computers, virtual machine instances, and/or data centers that are configured to host or execute one or more instances of host applications (114). In general, a host device (106) may be involved, directly or indirectly, in processing requests received from client devices (102). Each host device (106) may comprise, for example, one or more of a network device, a web server, an application server, a database server, etc. A collection of host devices (106) may be configured to implement a network-based service. For example, a provider of a network-based service may configure one or more host devices (106) and host applications (114) (e.g., one or more web servers, application servers, database servers, etc.) to collectively implement the network-based application.

In general, client devices (102) communicate with one or more host applications (114) to exchange information. The communication between a client device (102) and a host application (114) may, for example, be based on the Hypertext Transfer Protocol (HTTP) or any other network protocol. Content delivered from the host application (114) to a client device (102) may include, for example, HTML documents, media content, etc. The communication between a client device (102) and host application (114) may include sending various requests and receiving data packets. For example, in general, a client device (102) or application running on a client device may initiate communication with a host application (114) by making a request for a specific resource (e.g., based on an HTTP request), and the application server may respond with the requested content stored in one or more response packets.

In the illustrated embodiment, one or more of host applications (114) may generate various types of performance data during operation, including event logs, network data, sensor data, and other types of machine-generated data. For example, a host application (114) comprising a web server may generate one or more web server logs in which details of interactions between the web server and any number of client devices (102) is recorded. As another example, a host device (106) comprising a router may generate one or more router logs that record information related to network traffic managed by the router. As yet another example, a host application (114) comprising a database server may generate one or more logs that record information related to requests sent from other host applications (114) (e.g., web servers or application servers) for data managed by the database server.

2.2. Client Devices

Client devices (102) of FIG. 1 represent any computing device capable of interacting with one or more host devices (106) via a network (104). Examples of client devices (102) may include, without limitation, smart phones, tablet computers, handheld computers, wearable devices, laptop computers, desktop computers, servers, portable media players, gaming devices, and so forth. In general, a client device (102) can provide access to different content, for instance, content provided by one or more host devices (106), etc. Each client device (102) may comprise one or more client applications (110), described in more detail in a separate section hereinafter.

2.3. Client Device Applications

In an embodiment, each client device (102) may host or execute one or more client applications (110) that are capable of interacting with one or more host devices (106) via one or more networks (104). For instance, a client application (110) may be or comprise a web browser that a user may use to navigate to one or more websites or other resources provided by one or more host devices (106). As another example, a client application (110) may comprise a mobile application or "app." For example, an operator of a network-based service hosted by one or more host devices (106) may make available one or more mobile apps that enable users of client devices (102) to access various resources of the network-based service. As yet another example, client applications (110) may include background processes that perform various operations without direct interaction from a user. A client application (110) may include a "plug-in" or "extension" to another application, such as a web browser plug-in or extension.

In an embodiment, a client application (110) may include a monitoring component (112). At a high level, the monitoring component (112) comprises a software component or other logic that facilitates generating performance data related to a client device's operating state, including monitoring network traffic sent and received from the client device and collecting other device and/or application-specific information. Monitoring component (112) may be an integrated component of a client application (110), a plug-in, an extension, or any other type of add-on component. Monitoring component (112) may also be a stand-alone process.

In one embodiment, a monitoring component (112) may be created when a client application (110) is developed, for example, by an application developer using a software development kit (SDK). The SDK may include custom monitoring code that can be incorporated into the code implementing a client application (110). When the code is converted to an executable application, the custom code implementing the monitoring functionality can become part of the application itself.

In some cases, an SDK or other code for implementing the monitoring functionality may be offered by a provider of a data intake and query system, such as a system (108). In such cases, the provider of the system (108) can implement the custom code so that performance data generated by the monitoring functionality is sent to the system (108) to facilitate analysis of the performance data by a developer of the client application or other users.

In an embodiment, the custom monitoring code may be incorporated into the code of a client application (110) in a number of different ways, such as the insertion of one or more lines in the client application code that call or otherwise invoke the monitoring component (112). As such, a developer of a client application (110) can add one or more lines of code into the client application (110) to trigger the monitoring component (112) at desired points during execution of the application. Code that triggers the monitoring component may be referred to as a monitor trigger. For instance, a monitor trigger may be included at or near the beginning of the executable code of the client application (110) such that the monitoring component (112) is initiated or triggered as the application is launched, or included at other points in the code that correspond to various actions of the client application, such as sending a network request or displaying a particular interface.

In an embodiment, the monitoring component (112) may monitor one or more aspects of network traffic sent and/or received by a client application (110). For example, the monitoring component (112) may be configured to monitor data packets transmitted to and/or from one or more host applications (114). Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application (110) or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system (108) for analysis.

Upon developing a client application (110) that incorporates a monitoring component (112), the client application (110) can be distributed to client devices (102). Applications generally can be distributed to client devices (102) in any manner, or they can be pre-loaded. In some cases, the application may be distributed to a client device (102) via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component (112) may also monitor and collect performance data related to one or more aspects of the operational state of a client application (110) and/or client device (102). For example, a monitoring component (112) may be configured to collect device performance information by monitoring one or more client device operations, or by making calls to an operating system and/or one or more other applications executing on a client device (102) for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component (112) may also monitor and collect other device profile information including, for example, a type of client device, a manufacturer and model of the device, versions of various software applications installed on the device, and so forth.

In general, a monitoring component (112) may be configured to generate performance data in response to a monitor trigger in the code of a client application (110) or other triggering application event, as described above, and to store the performance data in one or more data records. Each data record, for example, may include a collection of field-value pairs, each field-value pair storing a particular item of performance data in association with a field for the item. For example, a data record generated by a monitoring component (112) may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
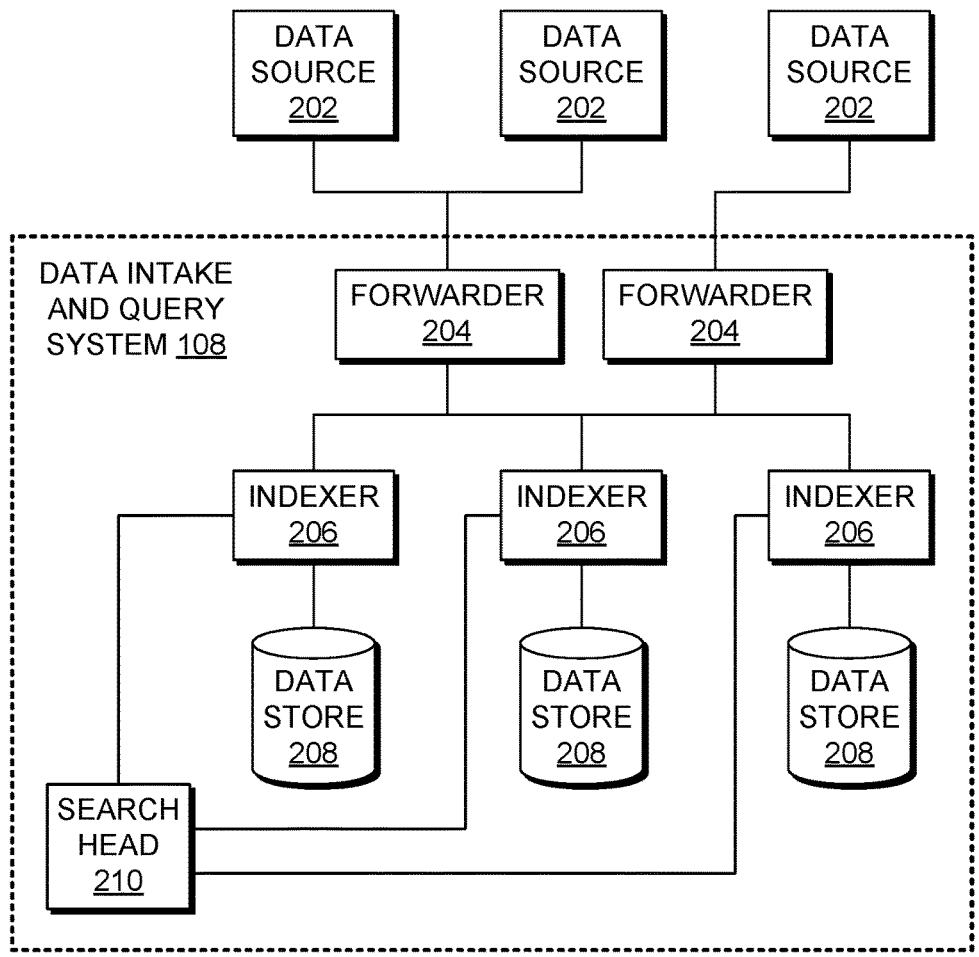
FIG. 2 illustrates a block diagram of an example data intake and query system in which an embodiment may be implemented.

FIG. 2 depicts a block diagram of an exemplary data intake and query system (108), similar to the SPLUNK® ENTERPRISE system. System (108) includes one or more forwarders (204) that receive data from a variety of input data sources (202), and one or more indexers (206) that process and store the data in one or more data stores (208). These forwarders and indexers can comprise separate computer systems, or may alternatively comprise separate processes executing on one or more computer systems.

Each data source (202) broadly represents a distinct source of data that can be consumed by a system (108).

Examples of a data source (202) include, without limitation, data files, directories of files, data sent over a network, event logs, registries, etc.

During operation, the forwarders (204) identify which indexers (206) receive data collected from a data source (202) and forward the data to the appropriate indexers. Forwarders (204) can also perform operations on the data before forwarding, including removing extraneous data, detecting timestamps in the data, parsing data, indexing data, routing data based on criteria relating to the data being routed, and/or performing other data transformations.

In an embodiment, a forwarder (204) may comprise a service accessible to client devices (102) and host devices (106) via a network (104). For example, one type of forwarder (204) may be capable of consuming vast amounts of real-time data from a potentially large number of client devices (102) and/or host devices (106). The forwarder (204) may, for example, comprise a computing device which implements multiple data pipelines or "queues" to handle forwarding of network data to indexers (206). A forwarder (204) may also perform many of the functions that are performed by an indexer. For example, a forwarder (204) may perform keyword extractions on raw data or parse raw data to create events. A forwarder (204) may generate time stamps for events. Additionally or alternatively, a forwarder (204) may perform routing of events to indexers. Data store (208) may contain events derived from machine data from a variety of sources all pertaining to the same component in an IT environment, and this data may be produced by the machine in question or by other components in the IT environment. All or a portion of the data store (208) may be referred to as a field-searchable data store. In one or more embodiments, field-searchable means that the fields of the raw machine data may be searched using extraction rules, as described below. The field-searchable data store may store event logs having events. Events in the event logs may be ordered according to the time of the event (e.g., by appending new events to the end of the event log). The event logs with corresponding events may be partitioned into buckets, wherein each bucket stores events corresponding to a specific time range. In one embodiment, the field searchable data store is implemented in indexers (206) where events are stored in buckets. In other embodiments, events may be stored in any data store (208) capable of storing events.

In one or more embodiments of the invention, data store (208) is any type of storage unit and/or device (e.g., a file system, database, collection of tables, or any other storage mechanism) for storing data. Further, data store (208) may include multiple different storage units and/or devices. The multiple different storage units and/or devices may or may not be of the same type or located at the same physical site.

2.5. Data Ingestion

Figure 3:
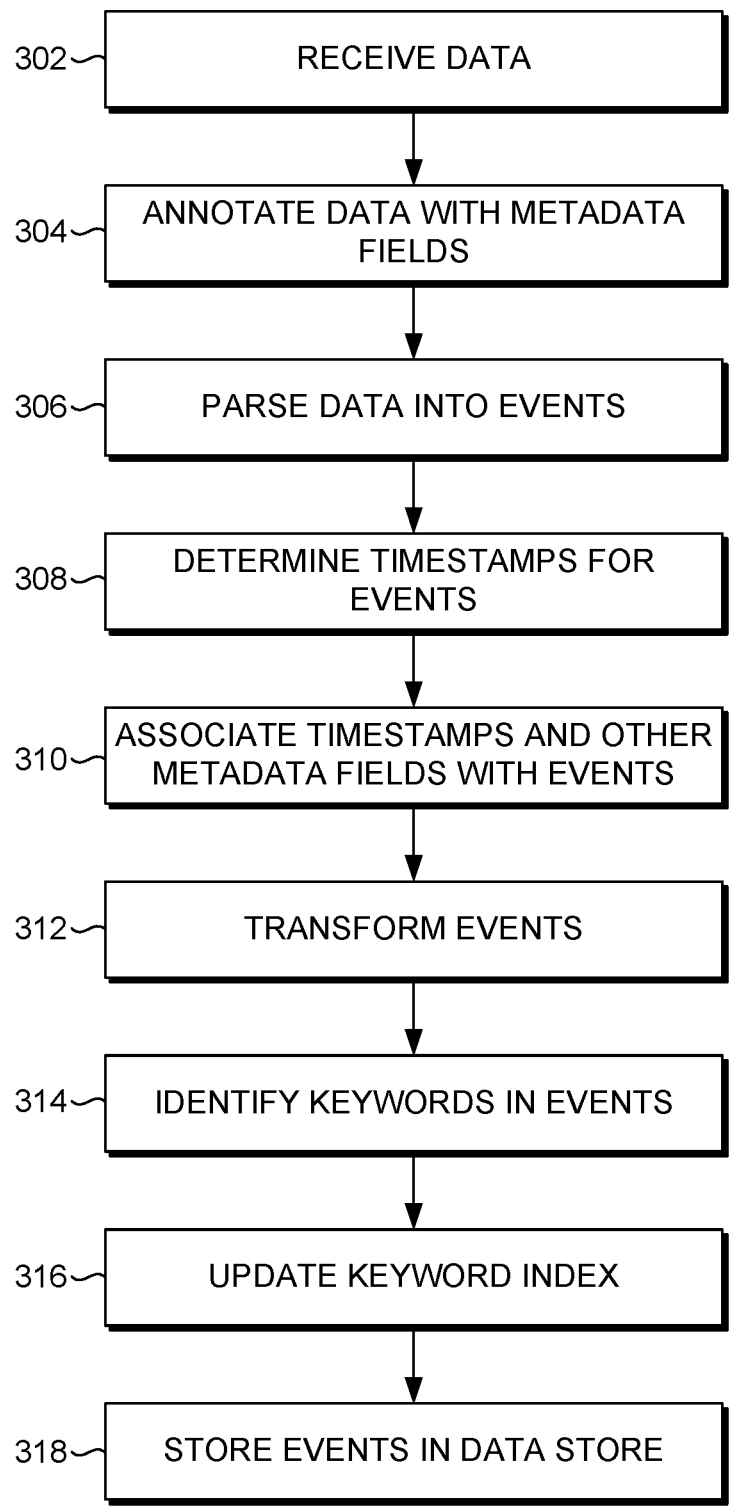
FIG. 3 is a flow diagram that illustrates how indexers process, index, and store data received from forwarders in accordance with the disclosed embodiments.

FIG. 3 depicts a flow chart illustrating an example data flow performed by Data Intake and Query system (108), in accordance with the disclosed embodiments. The data flow illustrated in FIG. 3 is provided for illustrative purposes only; those skilled in the art would understand that one or more of the blocks of the processes illustrated in FIG. 3 may be removed or the ordering of the blocks may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing blocks across system components may be used.

2.5.1. Input

At block (302), a forwarder receives data from an input source, such as a data source (202) shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing blocks.

At block (304), a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing blocks. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block (306), an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block (308), the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block (310), the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block (304), the default metadata fields associated with each event may include a host, source, and source type field including or in addition to a field storing the timestamp.

At block (312), an indexer may optionally apply one or more transformations to data included in the events created at block (306). For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks (314) and (316), an indexer can optionally generate a keyword index to facilitate fast keyword searching for event data. To build a keyword index, at block (314), the indexer identifies a set of keywords in each event. At block (316), the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block (318), the indexer stores the events with an associated timestamp in a data store (208). Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk. In the example, the flash memory and the hard disk may be remote storage. Other configurations may be used without departing from the scope of the invention.

Each indexer (206) may be responsible for storing and searching a subset of the events contained in a corresponding data store (208). By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
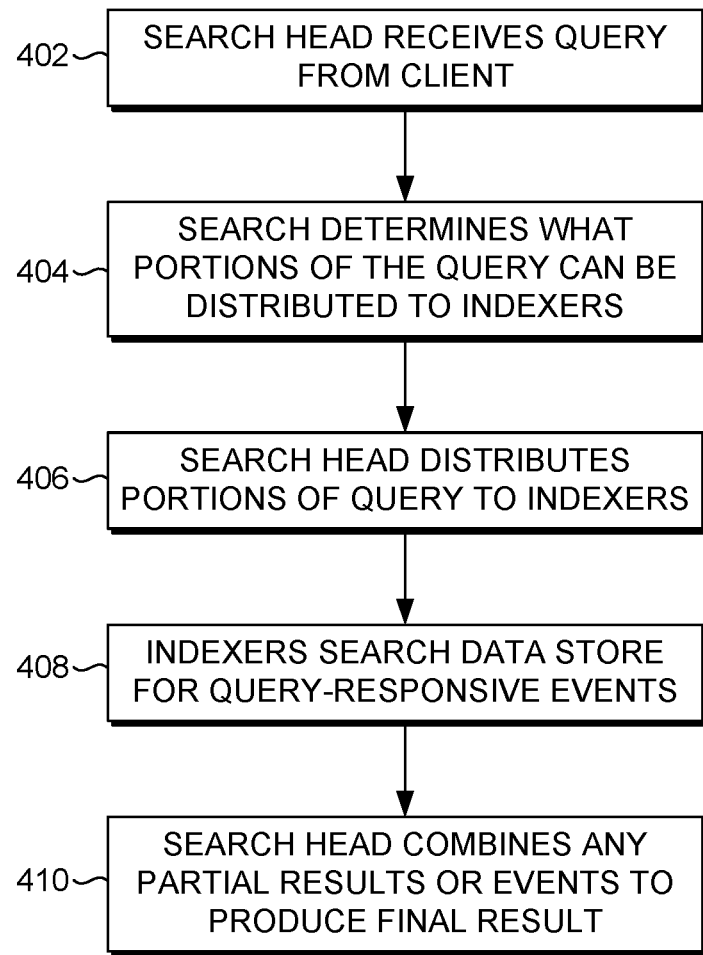
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block (402), a search head receives a search query from a client. At block (404), the search head analyzes the search query to determine what portion(s) of the query can be delegated to indexers and what portions of the query can be executed locally by the search head. At block (406), the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in the Figure) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block (408), the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block (408) may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block (410), the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system (108) can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head (210) allows users to search and visualize event data extracted from raw machine data received from homogenous data sources. It also allows users to search and visualize event data extracted from raw machine data received from heterogeneous data sources. The search head (210) includes various mechanisms, which may additionally reside in an indexer (206), for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language (SQL), can be used to create a query.

In response to receiving the search query, search head (210) uses extraction rules to extract values for the fields associated with a field or fields in the event data being searched. The search head (210) obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head (210) can apply the extraction rules to event data that it receives from indexers (206). Indexers (206) may apply the extraction rules to events in an associated data store (208). Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
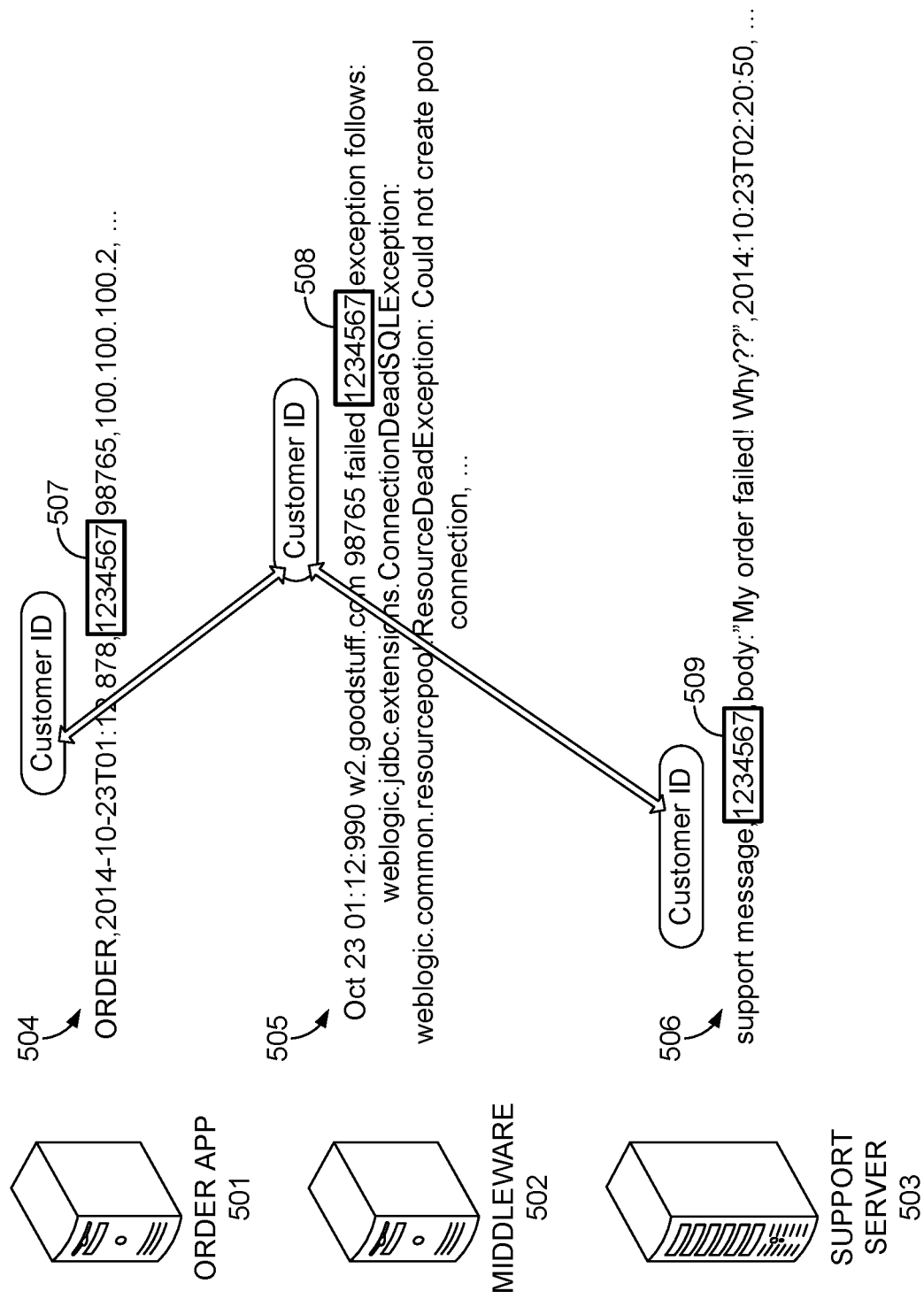
FIG. 5 illustrates an example scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program (501) running on the user's system. In this example, the order was not delivered to the vendor's server due to a resource exception at the destination server that is detected by the middleware code (502). The user then sends a message to the customer support (503) to complain about the order failing to complete. The three systems (501), (502), and (503) are disparate systems that do not have a common logging format. The order application (501) sends log data (504) to the SPLUNK® ENTERPRISE system in one format, the middleware code (502) sends error log data (505) in a second format, and the support server (503) sends log data (506) in a third format.

Using the log data received at one or more indexers (206) from the three systems the vendor can uniquely obtain an insight into user activity, user experience, and system behavior. The search head (210) allows the vendor's administrator to search the log data from the three systems that one or more indexers (206) are responsible for searching, thereby obtaining correlated information, such as the order number and corresponding customer ID number of the person placing the order. The system also allows the administrator to see a visualization of related events via a user interface. The administrator can query the search head (210) for customer ID field value matches across the log data from the three systems that are stored at the one or more indexers (206). The customer ID field value exists in the data gathered from the three systems, but the customer ID field value may be located in different areas of the data given differences in the architecture of the systems—there is a semantic relationship between the customer ID field values generated by the three systems. The search head (210) requests event data from the one or more indexers (206) to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values (507), (508), and (509), thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Cloud-Based System Overview

The example data intake and query system (108) described in reference to FIG. 2 comprises several system components, including one or more forwarders, indexers, and search heads. In some environments, a user of a data intake and query system (108) may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system (108) is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system (108) operate.

In one embodiment, to provide an alternative to an entirely on-premises environment for system (108), one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 6:
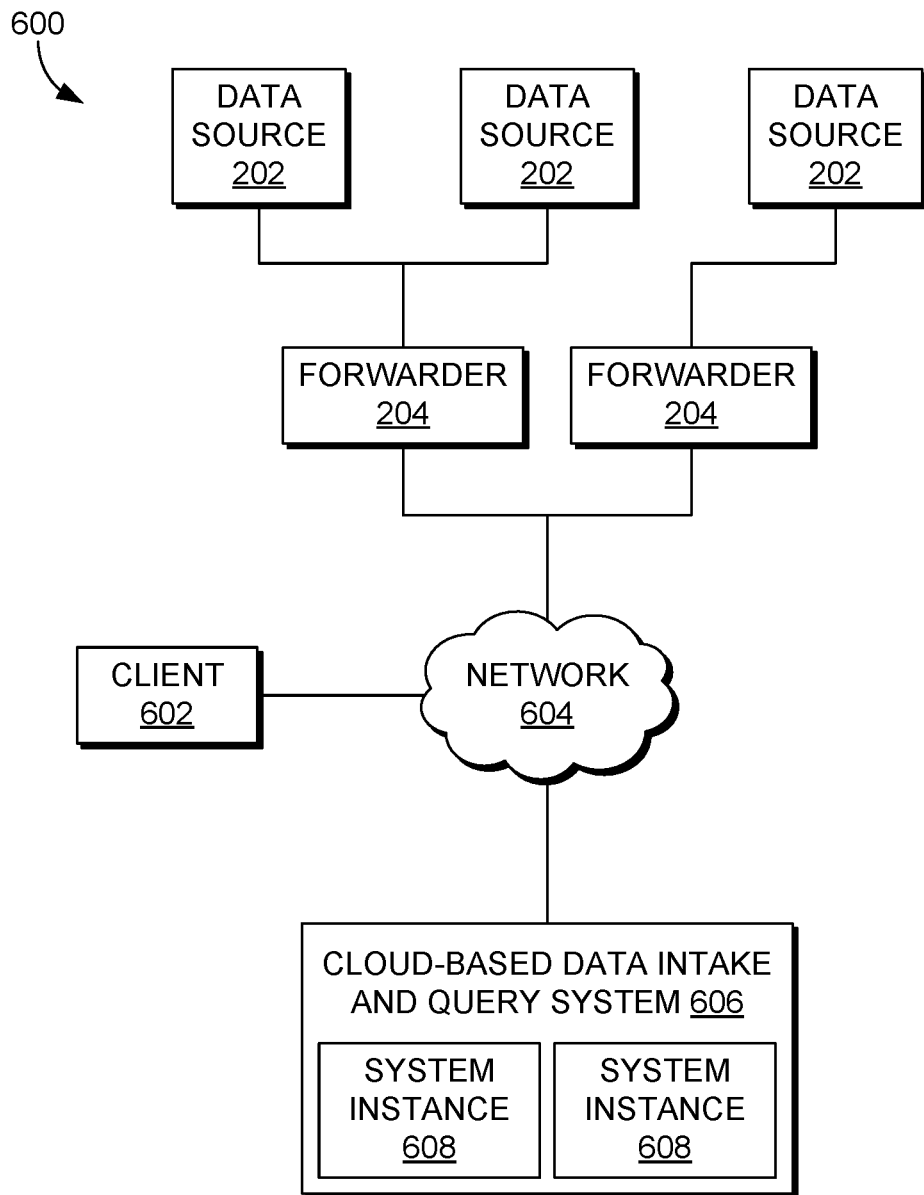
FIG. 6 illustrates a block diagram of an example cloud-based data intake and query system in which an embodiment may be implemented.

FIG. 6 illustrates a block diagram of an example cloud-based data intake and query system. Similar to the system of FIG. 2, the networked computer system (600) includes input data sources (202) and forwarders (204). These input data sources and forwarders may be in a subscriber's private computing environment. Alternatively, they might be directly managed by the service provider as part of the cloud service. In the example system (600), one or more forwarders (204) and client devices (602) are coupled to a cloud-based data intake and query system (606) via one or more networks (604). Network (604) broadly represents one or more LANs, WANs, cellular networks, intranet, etc., using any of wired, wireless, terrestrial microwave, satellite links, etc., and may include the public Internet, and is used by client devices (602) and forwarders (204) to access the system (606). Similar to the system of (108), each of the forwarders (204) may be configured to receive data from an input source and to forward the data to other components of the system (606) for further processing.

In an embodiment, a cloud-based data intake and query system (606) may comprise a plurality of system instances (608). In general, each system instance (608) may include one or more computing resources managed by a provider of the cloud-based system (606) made available to a particular subscriber. The computing resources comprising a system instance (608) may, for example, include one or more servers or other devices configured to implement one or more forwarders, indexers, search heads, and other components of a data intake and query system, similar to system (108). As indicated above, a subscriber may use a web browser or other application of a client device (602) to access a web portal or other interface that enables the subscriber to configure an instance (608).

Providing a data intake and query system as described in reference to system (108) as a cloud-based service presents a number of challenges. Each of the components of a system (108) (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance (608)) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.9. Searching Externally Archived Data

FIG. 7 shows a block diagram of an example of a data intake and query system (108) that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head (210) of the data intake and query system receives search requests from one or more client devices (704) over network connections (720). As discussed above, the data intake and query system (108) may reside in an enterprise location, in the cloud, etc. FIG. 7 illustrates that multiple client devices (704a), (704b), . . . , (704n) may communicate with the data intake and query system (108). The client devices (704) may communicate with the data intake and query system using a variety of connections. For example, one client device in FIG. 7 is illustrated as communicating over an Internet (Web) protocol, another client device is illustrated as communicating via a command line interface, and another client device is illustrated as communicating via a system developer kit (SDK).

The search head (210) analyzes the received search request to identify request parameters. If a search request received from one of the client devices (704) references an index maintained by the data intake and query system, then the search head (210) connects to one or more indexers (206) of the data intake and query system for the index referenced in the request parameters. That is, if the request parameters of the search request reference an index, then the search head accesses the data in the index via the indexer. The data intake and query system (108) may include one or more indexers (206), depending on system access resources and requirements. As described further below, the indexers (206) retrieve data from their respective local data stores (208) as specified in the search request. The indexers and their respective data stores can comprise one or more storage devices and typically reside on the same system, though they may be connected via a local network connection.

If the request parameters of the received search request reference an external data collection, which is not accessible to the indexers (206) or under the management of the data intake and query system, then the search head (210) can access the external data collection through an External Result Provider (ERP) process (710). An external data collection may be referred to as a "virtual index" (plural, "virtual indices"). An ERP process provides an interface through which the search head (210) may access virtual indices.

Thus, a search reference to an index of the system relates to a locally stored and managed data collection. In contrast, a search reference to a virtual index relates to an externally stored and managed data collection, which the search head may access through one or more ERP processes (710), (712). FIG. 7 shows two ERP processes (710), (712) that connect to respective remote (external) virtual indices, which are indicated as a Hadoop or another system (714) (e.g., Amazon S3, Amazon EMR, other Hadoop Compatible File Systems (HCFS), etc.) and a relational database management system (RDBMS) (718). Other virtual indices may include other file organizations and protocols, such as Structured Query Language (SQL) and the like. The ellipses between the ERP processes (710), (712) indicate optional additional ERP processes of the data intake and query system (108). An ERP process may be a computer process that is initiated or spawned by the search head (210) and is executed by the search data intake and query system (108). Alternatively or additionally, an ERP process may be a process spawned by the search head (210) on the same or different host system as the search head (210) resides.

The search head (210) may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head (210) determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes (710), (712) receive a search request from the search head (210). The search head may optimize the received search request for execution at the respective external virtual index. Alternatively, the ERP process may receive a search request as a result of analysis performed by the search head or by a different system process. The ERP processes (710), (712) can communicate with the search head (210) via conventional input/output routines (e.g., standard in/standard out, etc.). In this way, the ERP process receives the search request from a client device such that the search request may be efficiently executed at the corresponding external virtual index.

The ERP processes (710), (712) may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes (710), (712) generate appropriate search requests in the protocol and syntax of the respective virtual indices (714), (718), each of which corresponds to the search request received by the search head (210). Upon receiving search results from their corresponding virtual indices, the respective ERP process passes the result to the search head (210), which may return or display the results or a processed set of results based on the returned results to the respective client device.

Client devices (704) may communicate with the data intake and query system (108) through a network interface (720), e.g., one or more LANs, WANs, cellular networks, and/or intranet using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.9.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.0. Geographic Positioning Subsystem

Figure 8A:
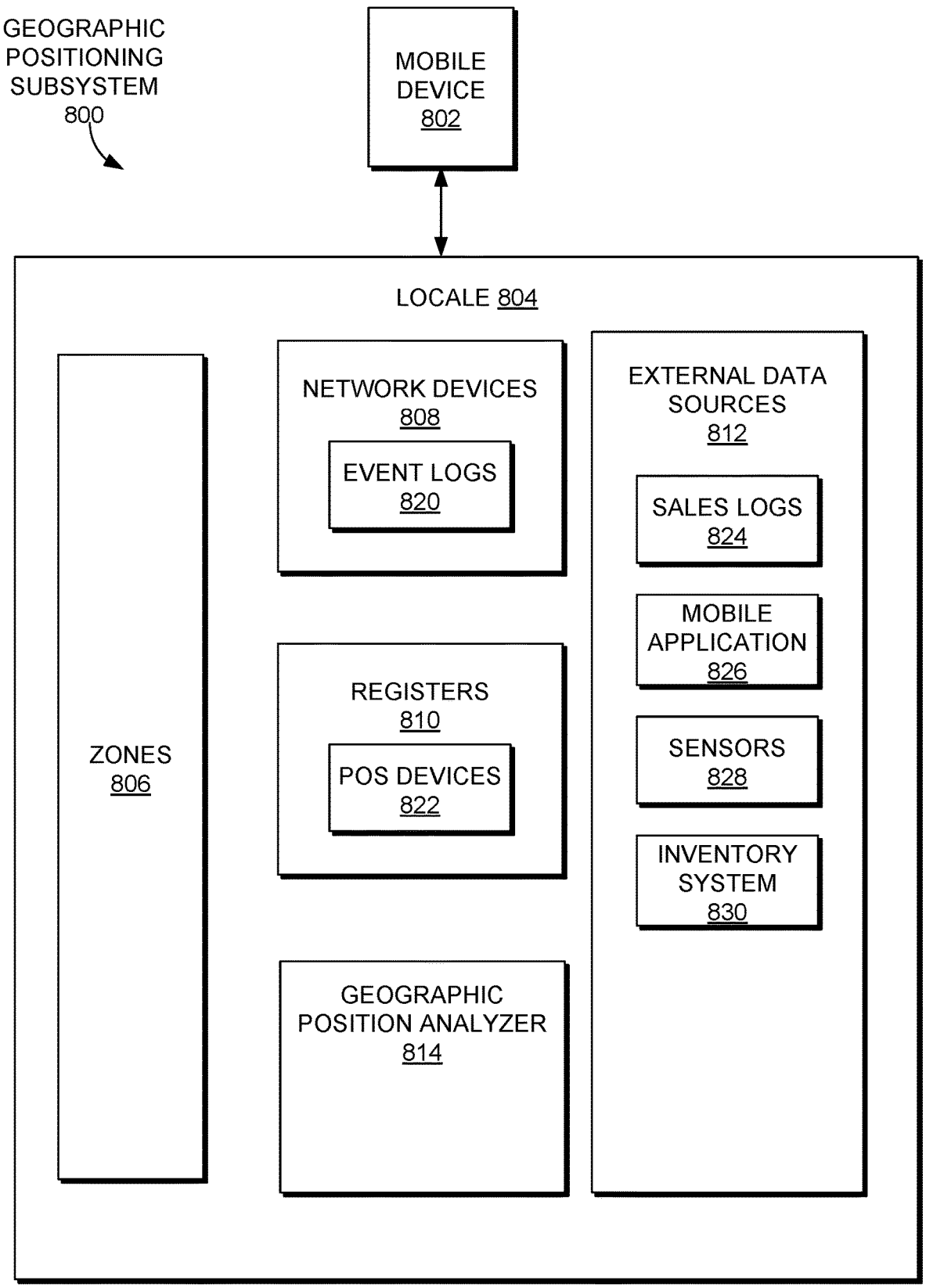
FIG. 8A, FIG. 8B, FIG. 8C, and FIG. 8D illustrate block diagrams of an example geographic positioning subsystem in which an embodiment may be implemented.

FIG. 8A shows a geographic positioning subsystem (800) in accordance with one or more embodiments of the invention. As shown in FIG. 8A, the geographic positioning subsystem (800) includes a mobile device (802) and a locale (804). In one or more embodiments, the mobile device (802) is any type of computing system, such as a client device (102). In one or more embodiments, the mobile device (802) may be a laptop computer, smart phone, personal digital assistant, tablet computer, gaming console, or any other type of electronic device or devices that includes at least the minimum processing power, memory, and input and output device(s) to perform one or more embodiments. For example, the mobile device (802) may include one or more hardware processor(s), associated memory (e.g., random access memory (RAM), cache memory, flash memory, etc.), one or more storage target device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

In one or more embodiments, the locale (804) includes zones (806), network devices (808), registers (810), external data sources (812), and a geographic position analyzer (814). In one or more embodiments, the locale (804) may represent a physical (e.g., brick-and-mortar) retail store. In one or more embodiments, the locale (804) is divided into zones (806). For example, a zone (806) may refer to a specific region of the locale (804), such as an entrance zone, shopping zone, zones of the shopping zone, lounge zone, order pickup zone, register (e.g., checkout) zone, external zone, customer service zone, food service zone, etc.

In one or more embodiments, the network devices (808) may be host devices (106) (e.g., a collection of host devices (106)) configured to implement a network-based service, such as provide a connection to a network (104). In one or more embodiments, a network device (808) may be a wireless access point that is wirelessly communicatively connected to the mobile device (802) and is in a communication path from the mobile device (802) to a wireless network (not shown). In one or more embodiments, the wireless access point may be directly connected via a direct wireless connection to a network interface card on the mobile device (802). In addition, wireless access points may be directly connected to the wireless network or connected to the wireless network via a controller. By way of an example, the wireless access point may communicate wirelessly with mobile devices (802) using Wi-Fi, Bluetooth or related standards.

In one or more embodiments, an event log (820) is associated with each network device (808). In one or more embodiments, the event log (820) includes portions of raw machine data associated with a timestamp. In one or more embodiments, the event log (820) stores a portion of raw machine data associated with a timestamp each time a mobile device (802) interacts (e.g., communicates) with the network device (808). The event log (820) for a network device (808) is described in detail in FIG. 8B.

In one or more embodiments, a register (810) includes a point-of-sale (POS) device (822). In one or more embodiments, a register (810) is a location of a locale at which a customer may complete a purchase of at least one product. For example, the POS device may total an amount of a sales transaction and the customer may provide financial account information or money to pay for the sales transaction. The register may or may not include a cashier and a waiting space for a waiting line for customers (e.g., customers waiting to complete a sales transaction).

In one or more embodiments, a POS device (822) includes functionality to process purchases, scan product codes to identify purchased products, and perform other functions related to the sale of products. For example, a POS device (822) may include a card reader (e.g., credit/debit card reader), a bar code reader, a receipt printer, an inventory scanner (e.g., RFID, Bar Code, Quick Response (QR) codes/matrix barcodes, etc.), a pin pad, computer system(s), and other devices. In one or more embodiments, the POS device (822) may include, or may itself be a part of, a cash register, a credit card scanner, or any other type of POS device.

In one or more embodiments, external data sources (812) include sales logs (824), mobile applications (826), sensors (828), an inventory system (830), etc. In one or more embodiments, a sales log (824) includes sales transactions obtained from a POS device (822). In one or more embodiments, the external data sources (812) may be accessible via a network (e.g., a wireless network specific to the locale (804)) that is separate from the network devices (808). In one or more embodiments, the external data sources (812) may be accessible via an application programming interface (API).

In one or more embodiments, a mobile application (826) includes user data corresponding to a user of the mobile device (802). In one or more embodiments, the user data includes previous sales transactions of the user (e.g., sales transactions occurring at the locale (804)), various other customer relationship management (CRM) data (e.g., a customer profile and demographics) corresponding to the user, etc. For example, the previous sales transactions of the user may include data on promotions redeemed by the user.

In one or more embodiments, the user data from the mobile application (826) may be combined with user data obtained from a website associated with the locale (804). For example, the website may be an online retail website associated with the locale (804) that includes user data related to online sales transactions of the user.

In one or more embodiments, sensors (828) include touch sensors, proximity sensors, optical sensors, motion sensors, auditory sensors, door chime sensors, etc. For example, a door chime sensor may generate sensor data that may be used to measure the size of walk-by traffic entering the locale (804). In one or more embodiments, a sensor (828) may generate sensor data that may be used in determining a geographic position of a mobile device (802).

In one or more embodiments, an inventory system (830) manages inventory items (e.g., products) at the locale (804). For example, the inventory system (830) may track the quantities of each inventory item at the locale (804). As another example, the inventory system (830) may track the expiration date of an inventory item at the locale (804). For example, a batch of inventory items may be associated with an expiration date. The inventory system (830) may also assist in ordering new inventory items, restocking existing inventory items, tracking customers and suppliers, selling inventory items, and performing other functions related to inventory. In one or more embodiments, the inventory system (830) includes functionality to update and receive updates when inventory items are sold via a POS device (822) at the locale (804).

3.1. Geographic Positioning Analyzer

In one or more embodiments, the geographic position analyzer (814) may be implemented in hardware (e.g., circuitry), software, or any combination thereof. In one or more embodiments, the geographic position analyzer (814) is a host application (114) executing on a host device (106). In one or more embodiments, the geographic position analyzer (108) is implemented as a component of the data intake and query system (108). In one or more embodiments, the geographic position analyzer (814) includes functionality to access external data sources (812) (e.g., via a wireless network of the locale (804))). In one or more embodiments, the geographic position analyzer (814) includes functionality to access network devices (808) (e.g., via network (104)).

Figure 8B:
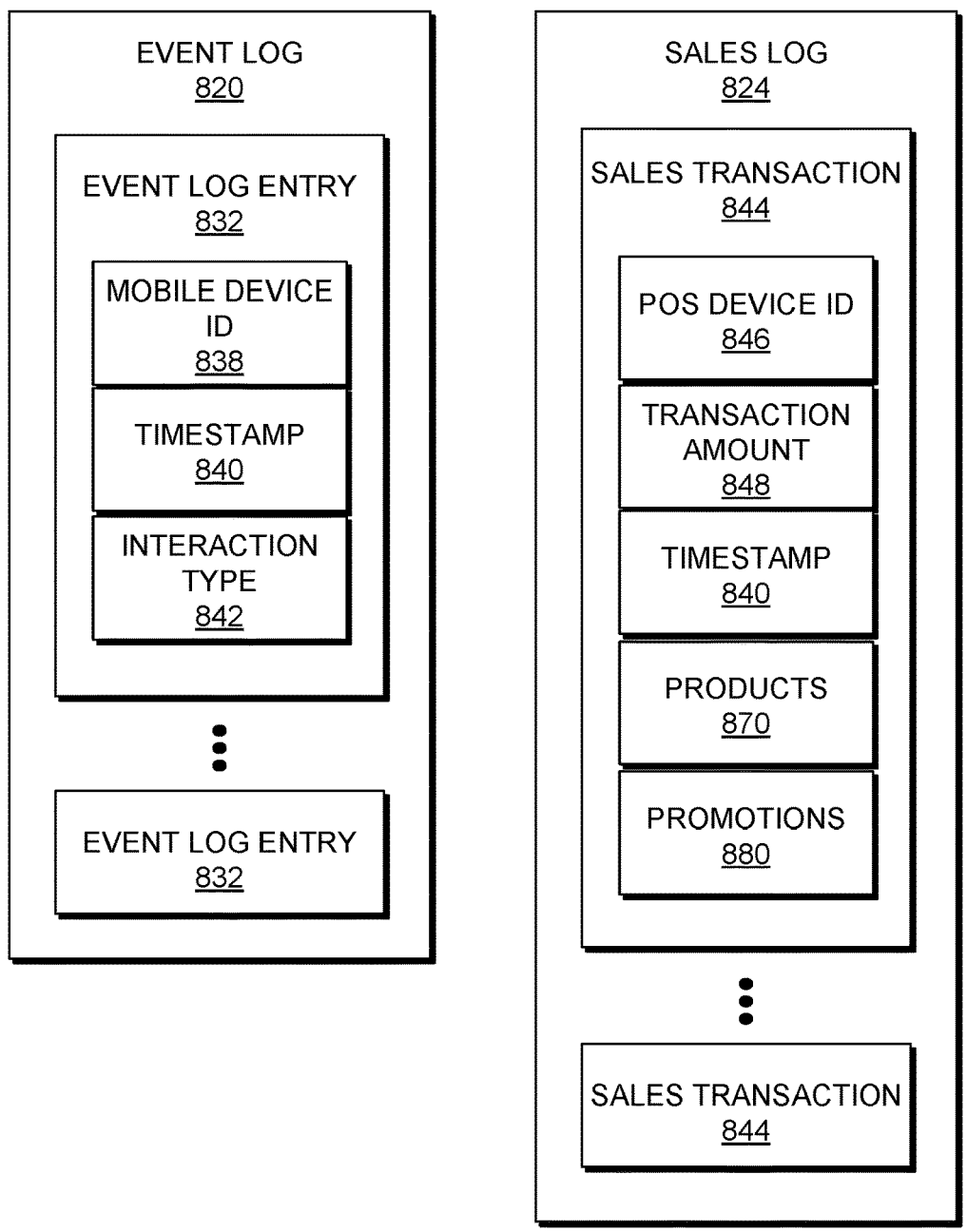

Turning to FIG. 8B, in one or more embodiments, the event log (820) corresponds to a specific network device (808). In other words, each network device (808) may include a unique event log for the network device. In some embodiments, the event log is shared by network devices that appends log entries to the end of the event log with an identifier of the network device.

In one or more embodiments, the event log (820) includes a series of event log entries (832), each including a mobile device ID (838), a timestamp (840), and an interaction type (842). In one or more embodiments, each event log entry (832) describes an interaction between a mobile device (802) and a network device (808) (e.g., the network device (808) corresponding to the event log (820)). For example, the interaction may be the mobile device requesting to access the network from the network device, the mobile device receiving data from the network via the network device, the connection between the mobile device and the network device being terminated, a device discovery communication between the mobile device and the network device, and other interactions. The mobile device ID (838) may be any identifier that uniquely identifies the mobile device (802). For example, the mobile device ID (838) may be a media access control (MAC) address of the mobile device (802). The timestamp (840) records a time of the interaction between the mobile device and the network device. In one or more embodiments, the timestamp records a single point in time of initiation or completion of the interaction. In one or more embodiments, the interaction type (842) stores a type of communication between the network device (808) and the mobile device (802). In one or more embodiments, the interaction type (842) may be: a request to initiate a connection, a request to receive data, a request to send data, a data transmission, a request to terminate a connection, and/or any other data request or data transmission as defined by a communication protocol (e.g., IEEE 802.11).

In one or more embodiments, the sales log (824) includes a series of sales transactions (844), each including a POS device ID (846), a transaction amount (848), a timestamp (840), products (870), and promotions (880). In one or more embodiments, the POS device ID (846) is any identifier that uniquely identifies a POS device (822). The transaction amount (848) lists the monetary amount exchanged during the sales transaction. The timestamp (840) is the time of the sales transaction (e.g., time of completion of the sales transaction). The products (870) are a list of products exchanged during the sales transaction. The promotions (880) are any marketing promotions applied to the sales transaction. The marketing promotions may include coupons, discounts for purchases of multiple units, customer loyalty discounts and other sales promotions that are performed to increase sales of one or more products.

Figure 8C:
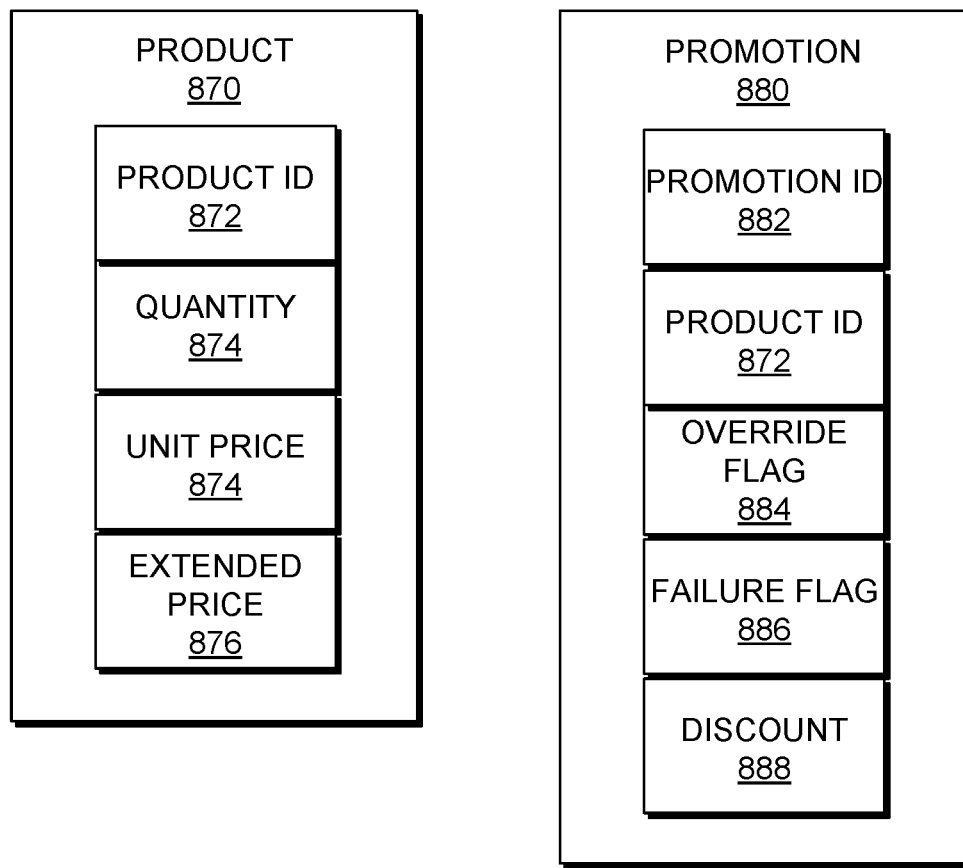

Turning to FIG. 8C, in one or more embodiments, each product (870) includes a product ID (872), a quantity (874), a unit price (876), and an extended price (878). In one or more embodiments, the product ID (872) may be a stock keeping unit (SKU) identifier or other product code. The quantity (874) is the number of units sold. The unit price (876) is the price per unit sold. The extended price is the total for the number of units. In one or more embodiments, the promotion (880) includes a promotion ID (882), an override flag (884), a failure flag (886), and a discount (888). The promotion ID (882) is a unique identifier of the promotion. The product ID (872) uniquely identifies the product or products in the promotion. In one or more embodiments, the override flag (884) indicates whether a manager override was required to process the corresponding promotion (880). For example, the POS device (822) (e.g., the POS device (822) corresponding to the POS device ID (846) of the sales transaction (844)) may have initially rejected the promotion (880), and a manager override was eventually required to redeem the promotion (880). In one or more embodiments, the failure flag (886) indicates whether the corresponding promotion (880) was unable to be processed. For example, the POS device (822) may have been unable to process the promotion (880) due to a software or hardware error in the POS device (822). In one or more embodiments, the discount (888) indicates the amount saved by redeeming the promotion (880).

Figure 8D:
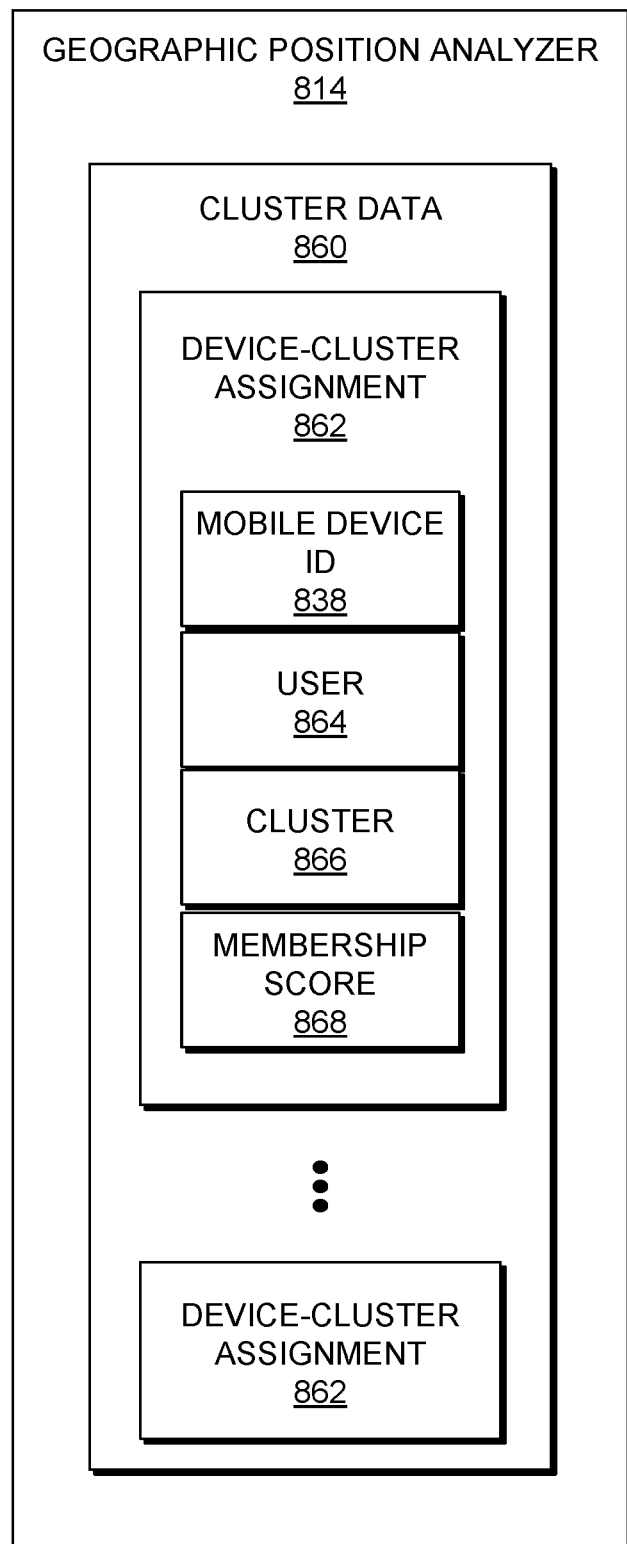

Turning to FIG. 8D, in one or more embodiments, the geographic position analyzer (814) includes cluster data (860). In one or more embodiments, the cluster data (860) includes a series of device-cluster assignments (862) for different mobile devices (802). In one or more embodiments, each device-cluster assignment (862) includes a mobile device ID (838) (e.g., a MAC address of the mobile device (802)), a user (864) (e.g., a user of the mobile device (802)), a cluster (866), and a membership score (868). In one or more embodiments, the user (864) of the mobile device (802) may be identified using a mobile application (826) that has access to information about the user (864). In one or more embodiments, the mobile device ID (838) of the mobile device (802) may be identified using the mobile application (826). In one or more embodiments, the cluster (866) may be assigned based on techniques for dividing a collection of mobile devices (802) into groups, called clusters, based on characteristics corresponding to the behavior of the mobile devices (802). That is, the mobile devices (802) assigned to a first cluster (866) are more similar to each other (e.g., relative to a value of the characteristic) than to mobile devices (802) assigned to other clusters (866). In one or more embodiments, the membership score (868) is a measure of the similarity of a specific mobile device (802) (e.g., the mobile device (802) corresponding to the mobile device ID (838)) relative to the average value of the characteristic in the cluster (866). In one or more embodiments, the membership score (868) of a mobile device (802) in a cluster (866) may be a percentage of the average value of the characteristic for the cluster (866). In one or more embodiments, grouping the mobile devices (802) into clusters (866) may be based on multiple characteristics.

In one or more embodiments, a fuzzy clustering technique may be used, where each mobile device (802) is a member of each cluster (866) to varying degrees, as indicated by the membership score (868) of the mobile device (802) for each cluster (866) (e.g., the membership score (868) for a mobile device (802) relative to a specific cluster (866) may be very low, even zero).

In one or more embodiments, the geographic position analyzer (814) includes functionality to determine a geographic position of a mobile device (802). In one or more embodiments, the geographic position analyzer (814) includes functionality to generate various performance metrics (e.g., sales metrics, operating metrics) for the locale (804).

While FIG. 1, FIG. 2, FIG. 6, FIG. 7, FIG. 8A, FIG. 8B, FIG. 8C, and FIG. 8D show configurations of components, other configurations may be used without departing from the scope of the invention. For example, various components may be combined to create a single component. As another example, the functionality performed by a single component may be performed by two or more components.

3.2. Geographic Positioning Methods

Figure 9A:
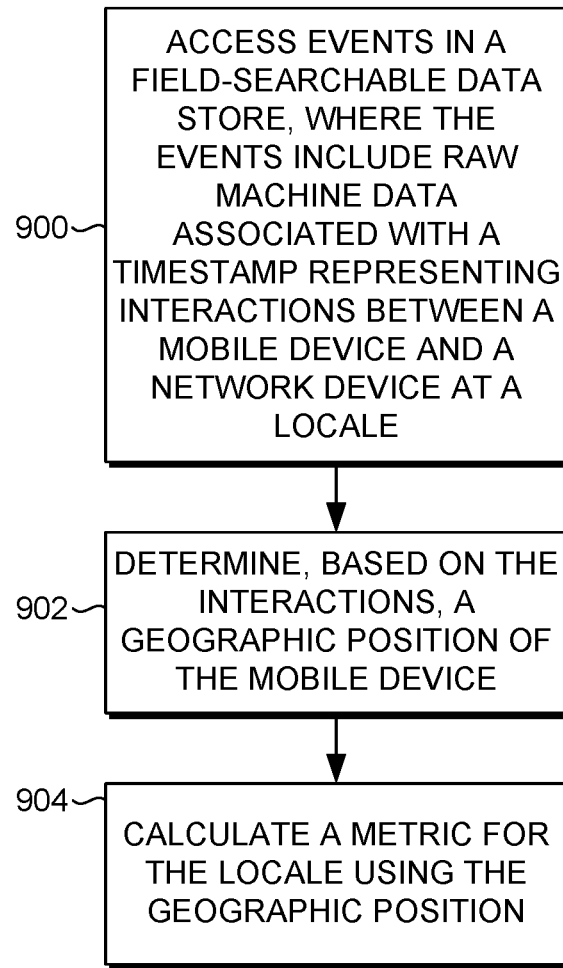
FIG. 9A, FIG. 9B, FIG. 9C, FIG. 9D, FIG. 10A, and FIG. 10B show flowcharts in accordance with one or more embodiments of the invention.

FIG. 9A shows a flowchart in accordance with one or more embodiments of the invention. In one or more embodiments, the process described in reference to FIG. 9A may be practiced using one or more components described in reference to FIG. 1, FIG. 2, FIG. 6, FIG. 7, FIG. 8A, FIG. 8B, FIG. 8C, and FIG. 8D (e.g., the geographic positioning analyzer (814) described in reference to FIG. 8A and FIG. 8D and the network device (808) described in reference to FIG. 8A and FIG. 8B). In one or more embodiments of the invention, one or more of the blocks shown in FIG. 9A may be omitted, repeated, and/or performed in parallel, or in a different order than the order shown in FIG. 9A. Accordingly, the scope of the invention should not be considered limited to the specific arrangement of blocks shown in FIG. 9A.

Initially, in block 900, events in a field-searchable data store are accessed. In one or more embodiments, the events include raw machine data associated with a timestamp, representing interactions between a mobile device and one or more network devices at a locale. In one or more embodiments, the network device may be a wireless access point that is wirelessly communicatively connected to the mobile device and is in a communication path from the mobile device to a network. The wireless access point may communicate wirelessly with the mobile device using Wi-Fi, Bluetooth or related standards. Events may be accessed using the data intake and query system described above. For example, a query may be sent to the search head of the data intake and query system for events for a particular mobile device using the mobile device identifier. In another embodiment, the initial query may be sent for each unique mobile device identifier, and a subsequent query may be sent for at least one of the mobile devices returned. The data intake and query system processes the queries as described above. In response to the query or subsequent query the data intake and query system returns raw machine data, each corresponding to log entries in the event log and each associated with a timestamp. The log entries may each be associated with a network device identifier of the network device when returned from the data intake and query system. For each log entry, the entire or only a portion of the log entry may be returned. Further, the data intake and query system may perform initial aggregation, such as determining the duration of time that the user is logged on to the network device based on the initial access request and the termination request.

In one or more embodiments, the log entries are not processed until after the request is sent for the events. Thus, the log entries are processed on demand and remain as raw machine data until after the real-time analysis request is sent.

In block 902, one or more geographic positions of the mobile device are determined, based on the interactions. In one or more embodiments, each geographic position may be a qualitative position of the mobile device, such as within a specific zone (e.g., a checkout zone, or an entrance zone). For example, an interaction between the mobile device and a single network device may be sufficient to determine a qualitative position of the mobile device within a zone of the locale. In one or more embodiments, the geographic position may be a quantitative position of the mobile device, such as numerical coordinates relative to a coordinate system (e.g., a coordinate system relative to the locale, or an absolute coordinate system). In one or more embodiments, an interaction between the mobile device and multiple network devices may be sufficient to determine a precise, quantitative position of the mobile device. In one or more embodiments, a triangulation process may be used to determine a quantitative position of the mobile device (e.g., by forming triangles to the position of the mobile device from known points), based on measuring the radial distance, the direction and/or the strength, of a received signal at two or three different network devices.

In one or more embodiments, geographic positions of the mobile device are determined and tracked as a series of interactions occur between the mobile device and one or more network devices at the locale. In one or more embodiments, a geographic position of the mobile device is determined and tracked when the mobile device requests a connection to a network at the locale from a network device (e.g., a network device that is a wireless access point). For example, the request for a connection to the network may occur when a user of the mobile device initially approaches the locale (e.g., from an exterior zone of the locale). Additional geographic positions of the mobile device may be determined and tracked as the user moves within the locale and additional interactions occur between the mobile device and one or more network devices at the locale. For example, the mobile device may subsequently request data from a network device to access a local wireless network at the locale. Alternatively, a network device at the locale may, at periodic intervals, initiate communication with (e.g., ping) the mobile device while the mobile device is within range of the network device, to enable the determination of a geographic position of the mobile device. For example, an interaction may correspond to the movement of the mobile device between zones at the locale.

In block 904, a metric for the locale using the geographic positions of the mobile device determined in block 902 above is calculated. In one or more embodiments, one or more geographic positions of the mobile device are used to calculate various quantities used to calculate the metric. For example, a metric that measures the amount of time spent by the mobile device at the locale may be calculated using a timestamp of an initial connection request from the mobile device and a timestamp at which the connection was terminated (or a timestamp at which the mobile device no longer responded to a request from the network device).

In one or more embodiments, the geographic positions of the mobile device are used to trace the movement of the mobile device within the locale. For example, the initial geographic position of the mobile device may be in an exterior zone where the mobile device first connects to a network of the locale. Then the geographic position of the mobile device may continue through various interior zones of the locale (e.g., an entrance zone, a shopping zone, and a checkout zone). Finally, the mobile device may exit the locale (e.g., when the mobile device terminates its connection to the network of the locale).

As another example, a metric that measures a register waiting time, or the length of a time interval during which a user of the mobile device waited in a checkout line at a register may be determined as follows. The starting point of the time interval may be the timestamp at which a geographic position of the mobile device was first within a pre-determined zone of the locale (e.g., a zone corresponding to the checkout line), as determined from an interaction (e.g., accessed from an event log of a network device) between the mobile device and a network device at the locale. For example, the pre-determined zone may be described in terms of a set of geographic positions. The ending point of the time interval may be the timestamp at which the geographic position of the mobile device was within a pre-determined threshold of the geographic position of a POS device (e.g., a POS device at the register in the checkout zone). Alternatively or additionally, the ending point of the time interval may be correlated with a timestamp of a sales transaction obtained from a POS device in the pre-determined zone (e.g., the geographic position of the mobile device was within a pre-determined threshold of the geographic position of the POS device at the same time a sales transaction was processed).

In one or more embodiments, a metric may measure the correlation of a volume of sales (e.g., at a specific register and/or POS device) within a time interval to the average wait time incurred by mobile devices in a checkout zone (e.g., corresponding to the register and/or POS device) within the time interval.

As another example, a metric may measure a walk-by conversion rate, or a fraction of customers (e.g., customers with mobile devices) entering the locale who complete a sales transaction may be determined as follows. The geographic position of each mobile device may be tracked, beginning with the first interaction between the mobile device and a network device at the locale. As described above, successive geographic positions within the locale may be tracked for each mobile device. If the geographic position of the mobile device is within a pre-determined threshold of a geographic position of a POS device at the locale, then it may be determined that the customer using the mobile device completed a purchase (e.g., as indicated in a sales transaction) at the locale. This determination may be confirmed if the geographic position of the mobile device remained with a threshold of the geographic position of the POS device for at least a pre-determined amount of time. In one or more embodiments, further confirmation of the purchase may be obtained by correlating a sales transaction from a sales log of the POS device with a sales transaction obtained from a mobile application of the locale executing on the mobile device as described below.

As another example, a metric that measures a walk-by conversion time, or the average amount of time between users (e.g., mobile devices) entering the locale and making a purchase may be determined by averaging the lengths of time intervals between mobile devices' entry to the locale and reaching (within a pre-determined threshold) the geographic position of the POS device.

In one or more embodiments, the value of a metric may be calculated over periodic time intervals, such as a day of the week and/or a time of day. In one or more embodiments, trends may be observed in the value of the metric relative to specific periodic time intervals. In one or more embodiments, a linear regression model may be used to detect trends in the historical values of the metric. In one or more embodiments, any other statistical model may be used to detect the trends in the value of the metric. In one or more embodiments, the trends may be used to predict the value of the metric relative to future periodic time intervals. For example, the value of the metric may have historically trended within a specific range on Monday mornings, and may therefore be predicted to continue trending within the specific range on subsequent Monday mornings. In one or more embodiments, a substantial deviation from a historical trend may be interpreted as an anomaly that may be discarded from analysis.

As another example, a metric that measures the size of walk-by traffic, or the number of mobile devices passing by the locale (e.g., on the sidewalk adjacent to the locale) may be determined by counting the number of mobile devices interacting with a network device at the locale, where the geographic position of the mobile device is in a specific zone of the locale (e.g., an external, sidewalk zone) within a time interval. Alternatively or additionally, the size of walk-by traffic may be measured by obtaining information from various sensors deployed at the locale (e.g., door chime sensors).

The size of the walk-by traffic may be measured for various time intervals, and substantial deviations from a historical trend may be interpreted as an anomaly to be discarded from analysis. For example, a spike in walk-by traffic may be due to a special event (e.g., a sports event or concert) or recurring event (e.g., a bus dropping off passengers) being held nearby.

Similarly, a metric that measures the size of a register (e.g., checkout) line, may be determined by counting the number of mobile devices whose geographic position is within a specific zone of the locale (e.g., a checkout zone) within a time interval. For example, an average size of a register line may be calculated for various (e.g., periodic) time intervals.

In a similar fashion, other metrics may be calculated using geographic positions of one or more mobile devices. Examples of other metrics may include an average amount of time spent in various zones of the locale (e.g., in a shopping zone, in a sidewalk zone external to the locale). In one or more embodiments, the value of a metric may be confirmed using information obtained from additional data sources (e.g., various sensors, a mobile application of the mobile device, POS device sales logs, etc.).

Figure 9B:
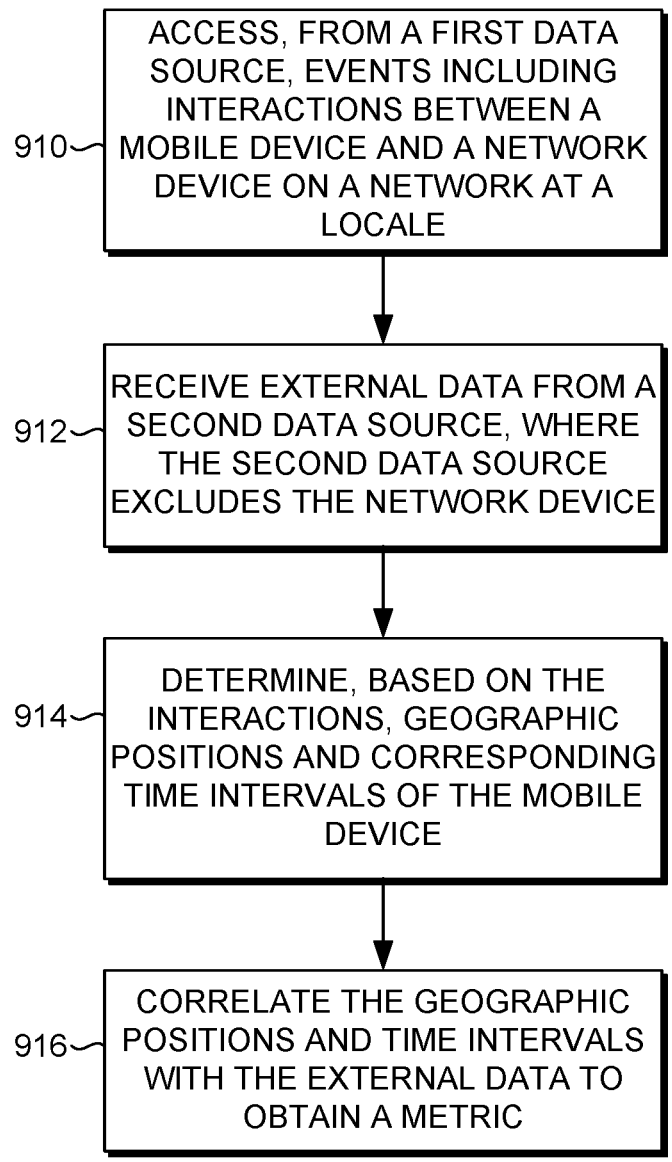

FIG. 9B shows a flowchart in accordance with one or more embodiments of the invention. In particular, FIG. 9B shows a flowchart for correlating information from external sources with log entries for network devices in order to determine a metric. In one or more embodiments, the process described in reference to FIG. 9B may be practiced using one or more components described in reference to FIG. 1, FIG. 2, FIG. 6, FIG. 7, FIG. 8A, FIG. 8B, FIG. 8C, and FIG. 8D (e.g., the geographic positioning analyzer (814) described in reference to FIG. 8A and FIG. 8D and the network device (808) described in reference to FIG. 8A and FIG. 8B). In one or more embodiments of the invention, one or more of the blocks shown in FIG. 9B may be omitted, repeated, and/or performed in parallel, or in a different order than the order shown in FIG. 9B. Accordingly, the scope of the invention should not be considered limited to the specific arrangement of blocks shown in FIG. 9B.

Initially, in block 910, events including interactions between a mobile device and one or more network devices on a network at a locale are accessed from a first data source. In one or more embodiments, the events include raw machine data associated with a timestamp. In one or more embodiments, the first data source may be an event log of the network device. Obtaining events may be performed in a same or similar manner as described above with reference to block 900 of FIG. 9A.

In block 912, external data from a second data source is received. In one or more embodiments, the second data source excludes the network devices. In one or more embodiments, the second data source is accessible via a network (e.g., a wireless network that is specific to the locale) that is separate from the network devices. In one or more embodiments, the second data source may be a POS device at the locale.

Obtaining information from the POS device may be direct from the point of sale device using an application programming interface of the point of sale device. By way of another example, sales logs from the point of sale device may be sent as unstructured raw machine data to the data intake and query system or indirect. In such a scenario, the search head may be queried for sales transactions matching a time frame in which the mobile device is located at the register (e.g., within the vicinity of the POS device). Because multiple sales transactions may exist at the time of the mobile device being in the register zone, a statistic about the multiple sales transactions may be attributed to the mobile device if a particular sales transaction cannot be attributed to the user of the mobile device. For example, after filtering any other sales transactions that can be attributed to other mobile devices or other users, the statistic may be generated. The statistic may be average of remaining sales transactions, the median of the remaining sales transactions or other statistics. As described above, the search head, after searching for the sales transactions, may calculate the statistic and return the statistic. By way of another example, the statistic may be generated by the geographic position analyzer.

By way of another example, sales logs may be sent from the POS device to a structured database that is distinct from the data intake and query system. In such a scenario, a query may be sent to the structured database to obtain the sales transaction information for the mobile device. In such a scenario, the structured database may respond to the query with attribute value pairs. Further, if the customer is part of a loyalty program or pays with any identifier of the customer and the customer can be assigned to the mobile device, then a particular sales transaction is assigned to the customer. If the mobile device cannot be directly or indirectly attributed to a particular sales transaction, then a statistic may be generated from the set of remaining sales transactions as described above. The statistic may be generated by the geographic position analyzer or by the structured database.

Continuing with the examples of the second data source, in one or more embodiments, the second data source may be a mobile application executing on the mobile device. The mobile application may include user data corresponding to a user of the mobile device. In one or more embodiments, the user data includes previous sales transactions of the user (e.g., sales transactions occurring at the locale) and customer relationship management (CRM) data corresponding to the user. For example, the previous sales transactions of the user may include data on promotions redeemed by the user.

In one or more embodiments, the second data source may be a sensor at the locale (e.g., touch sensors, proximity sensors, optical sensors, door chime sensors, etc.). In one or more embodiments, a sensor may generate sensor data in response to an input or stimulus that may be used in determining a geographic position of a mobile device. In one or more embodiments, the second data source may be an inventory system that manages inventory items (e.g., products) at the locale. For example, the inventory system may track the quantities and expiration dates corresponding to each inventory item at the locale.

In block 914, one or more geographic positions of the mobile device are determined, based on the interactions. Determining geographic positions may be performed as discussed above with reference to block 902 in FIG. 9A. In one or more embodiments, a geographic position may be related to a time interval of a mobile device at the geographic position. In one or more embodiments, the time interval may be a single point in time (e.g., corresponding to a timestamp obtained from an event log of a network device). In one or more embodiments, the time interval may be a range bounded by starting and ending points. For example, the mobile device may be assumed to be at a geographic position during the time interval bounded by a timestamp corresponding to a first interaction between the mobile device and a network device, and a timestamp corresponding to a second interaction between the mobile device and a network device.

In block 916, the geographic positions and time intervals determined in block 914 above are correlated with the external data to obtain a metric. Also see description above of block 904 in FIG. 9A. Various metrics may be calculated based on correlating the geographic positions and time intervals with the external data. In one or more embodiments, the second data source is a POS device at the locale, and the metric may correlate a volume of sales (e.g., obtained from a sales log of the POS device) within a time interval to an average wait time incurred by mobile devices whose geographic positions are within in a checkout zone (e.g., corresponding to the POS device) within the time interval. That is, the average wait time incurred by mobile devices may be calculated using a succession of geographic positions within the checkout zone, where each geographic position corresponds to a time interval.

In one or more embodiments, the second data source is a sensor at the locale. For example, correlating sensor data obtained from a door chime sensor (e.g., attached to an entrance door of the locale) with the geographic positions and time intervals determined in block 914 above may be used in the calculation of a walk-by entry rate metric, or a fraction of customers passing by the locale who actually enter the locale. For example, geographic positions and corresponding time intervals may be determined for each mobile device (e.g., corresponding to a potential customer) moving between an exterior zone of the locale to an interior zone of the locale. The succession of geographic positions and corresponding time intervals may be used to determine what fraction of potential customers passing by the exterior of the locale actually enter the locale, and how long the customers remain at the locale. This information may be correlated with the sensor data obtained from the door chime sensor, which may track the number of potential customers entering the locale at various points in time. Correlating the different sources of information (e.g., the sensor data and the geographic position data) may yield a more accurate measurement of the metric than if a single source of information were used.

By way of another example, the correlation may relate the amount of time that a customer is in the locale with the total amount of the sales transaction. Statistics may be applied over several customers to determine whether a length of time that a customer is in a locale increases total amount sold, or the optimal amount of time for the customer to be in the locale. The correlation may be to determine where customers spend time in the locale.

Figure 9C:
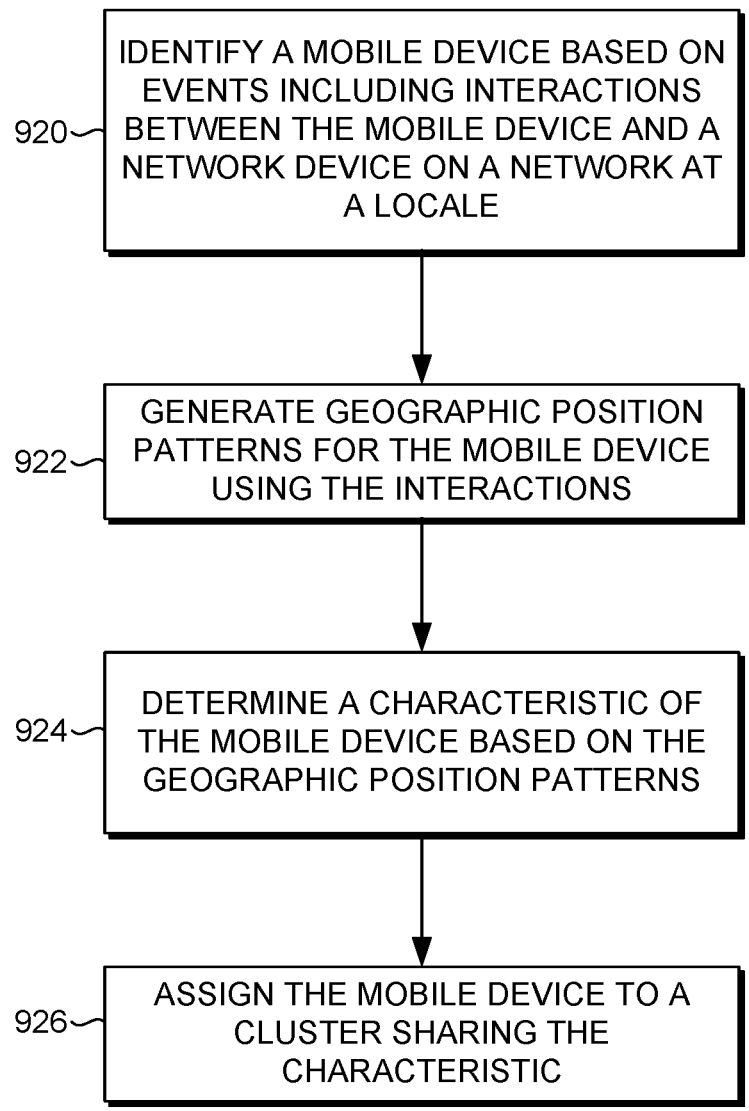

FIG. 9C shows a flowchart in accordance with one or more embodiments of the invention. In particular, FIG. 9C shows a flowchart for clustering mobile devices. In one or more embodiments, the process described in reference to FIG. 9C may be practiced using one or more components described in reference to FIG. 1, FIG. 2, FIG. 6, FIG. 7, FIG. 8A, FIG. 8B, FIG. 8C, and FIG. 8D (e.g., the geographic positioning analyzer (814) described in reference to FIG. 8A and FIG. 8D and the network device (808) described in reference to FIG. 8A and FIG. 8B). In one or more embodiments of the invention, one or more of the blocks shown in FIG. 9C may be omitted, repeated, and/or performed in parallel, or in a different order than the order shown in FIG. 9C. Accordingly, the scope of the invention should not be considered limited to the specific arrangement of blocks shown in FIG. 9C.

Initially, in block 920, a mobile device is identified based on events including interactions between the mobile device and a network device on a network at a locale. Obtaining events may be performed in a same or similar manner as described above with reference to block 900 of FIG. 9A. In one or more embodiments, the events are accessed from an event log of the network device. In one or more embodiments, each event log entry of the event log includes a mobile device ID, which may be a MAC address of the mobile device. Each event log entry may also include a timestamp, and an interaction type.

In block 922, geographic position patterns are generated for the mobile device using the interactions. As discussed above in the description of block 902 in FIG. 9A, in one or more embodiments, geographic positions of the mobile device are determined and tracked as a series of interactions occur between the mobile device and one or more network devices at the locale. In one or more embodiments, a series of successive geographic positions of the mobile device may correspond to movement of the mobile device within the locale (e.g., within various zones of the locale). In one or more embodiments, the geographic positions of the mobile device may be organized into geographic position patterns. Various techniques (e.g., machine learning techniques) for detecting patterns in a collection of data may be used when generating the geographic position patterns.

In block 924, a characteristic of the mobile device is determined based on the geographic position patterns. In one or more embodiments, the characteristic may correspond to a behavior of a user of the mobile device. Specific characteristics may be of relevance from a retail perspective for segmenting customers (e.g., to determine which customers to target with which promotions). For example, a characteristic may correspond to spending a substantial amount of time in a specific zone at the locale (e.g., a lounge area, a specific shopping aisle, or promotional display zone), which may be useful information when considering which users to target for which types of promotions (e.g., coffee and snacks). Other examples of characteristics based on geographic position patterns may be: visiting the locale on average every N days (e.g., an "average return rate" of N days), spending an average length of time of K minutes at the locale per visit, making a brief visit to the locale on most weekdays around lunchtime, visiting the locale on most Saturday mornings, etc. In one or more embodiments, the characteristic may be based on information obtained from a mobile application executing on the mobile device, including: percentage of promotions redeemed, total amount of sales, etc.

In block 926, the mobile device is assigned to a cluster sharing the characteristic. In one or more embodiments, clustering techniques (e.g., k-means clustering, based on unsupervised machine learning techniques) may be used to group similar mobile devices into clusters where each member of the cluster is more similar (e.g., relative to the characteristic) to the other members of the cluster than to members of different clusters. In one or more embodiments, a membership score indicates the degree of similarity of a mobile device relative to the average value of the characteristic in the cluster. In one or more embodiments, the membership score of a mobile device in a cluster may be a percentage of the average value of the characteristic for the cluster. In one or more embodiments, grouping the mobile devices into clusters may be based on multiple characteristics.

Figure 9D:
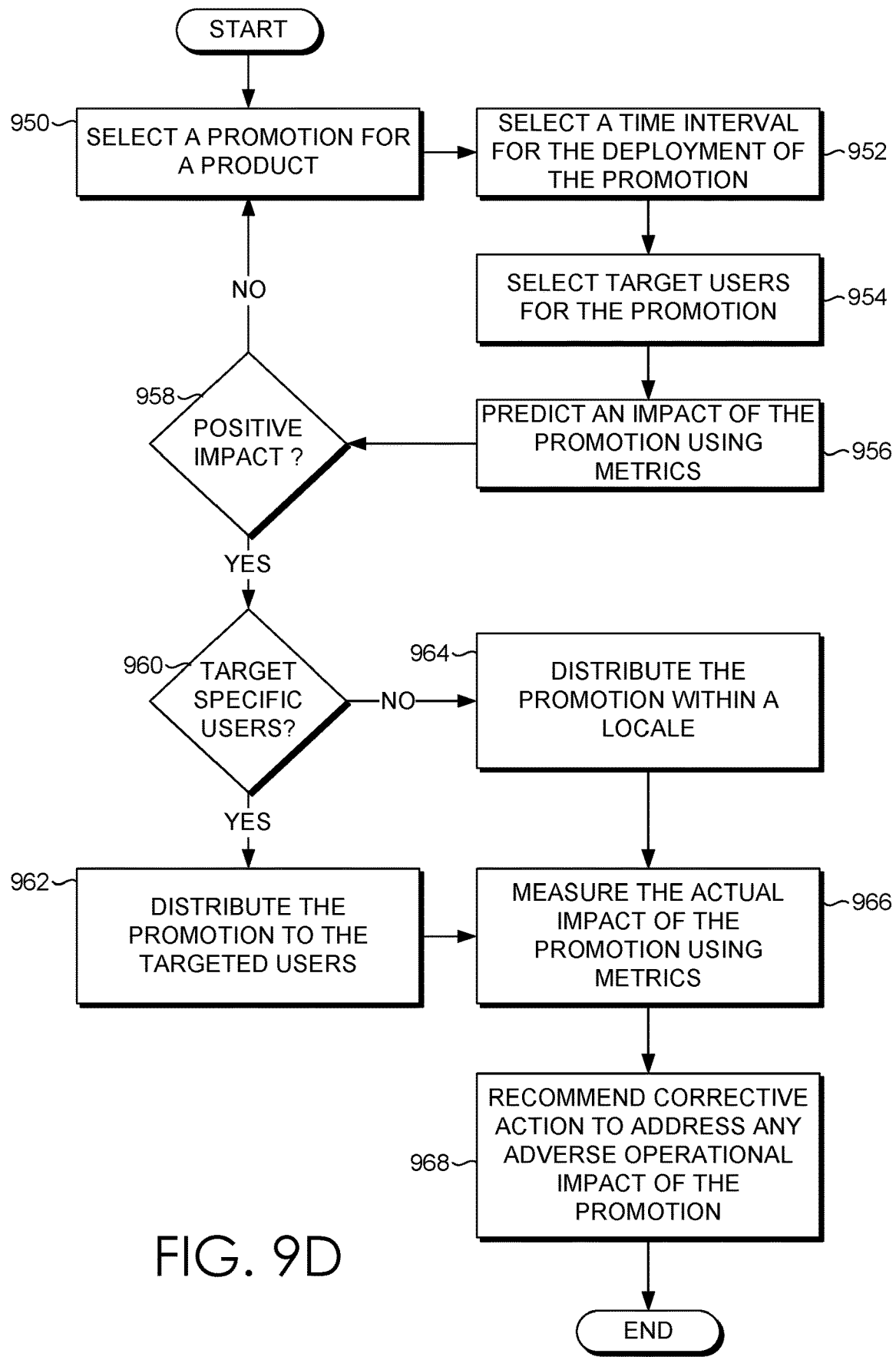

FIG. 9D shows a flowchart in accordance with one or more embodiments of the invention. In one or more embodiments, the process described in reference to FIG. 9D may be practiced using one or more components described in reference to FIG. 1, FIG. 2, FIG. 6, FIG. 7, FIG. 8A, FIG. 8B, FIG. 8C, and FIG. 8D (e.g., the geographic positioning analyzer (814) described in reference to FIG. 8A and FIG. 8D and the network device (808) described in reference to FIG. 8A and FIG. 8B). In one or more embodiments of the invention, one or more of the blocks shown in FIG. 9D may be omitted, repeated, and/or performed in parallel, or in a different order than the order shown in FIG. 9D. Accordingly, the scope of the invention should not be considered limited to the specific arrangement of blocks shown in FIG. 9D.

Initially, in block 950, a promotion for a product is selected. In one or more embodiments, the product may be a product category (e.g., coffee) or a specific product (e.g., cappuccino). In one or more embodiments, the product may be associated with an attribute (e.g., low fat). In one or more embodiments, the promotion and the product may be selected by an employee at the locale, to support the decision-making process regarding which promotions to run on which products. In one or more embodiments, the promotion may apply a discount to the product. In one or more embodiments, the product may correspond to an inventory item flagged by an inventory system of the locale whose expiration date is within a pre-determined time interval (e.g., an inventory item whose expiration date is the following day).

In block 952, a time interval is selected for the deployment of the promotion. In one or more embodiments, the time interval may be selected based on historical sales data (e.g., obtained from sales logs obtained from POS devices at the locale) for the product at the locale. For example, a specific day of the week and time of day may be selected if that day and time typically corresponds with a low volume of sales for the product. In one or more embodiments, the time interval may be selected based on historical promotional redemption data (e.g., obtained from sales logs obtained from POS devices at the locale) for the selected promotion at the locale. In one or more embodiments, when the product corresponds to an inventory item whose expiration date is within a pre-determined time interval, then the time interval selected for the deployment of the promotion may be selected to be prior to the expiration date. Marketing personnel may select the time interval, the time interval may be preset as a default time interval, or the time interval may automatically be selected based on calculations using historical data.

In block 954, target users are selected for the promotion. Selecting target users may be performed by querying the cluster data using characteristics or attributes of target users. Below are a few examples of characteristics or attributes that may be used when transmitting the query. In one or more embodiments, a user of the mobile device may be identified using a mobile application (e.g., a mobile application corresponding to the locale) executing on the mobile device that has access to information about the user. In one or more embodiments, the mobile application includes data on previous sales transactions of the user, include data on promotions redeemed by the user.

In one or more embodiments, the target users are members of a cluster whose characteristic correlates with a purchasing preference for the product. In one or more embodiments, the target users are members of a cluster whose characteristic correlates with a purchasing preference for the product category corresponding to the product. In one or more embodiments, the target users are members of a cluster whose characteristic correlates with a purchasing preference for an attribute (e.g., low fat) of the product.

In one or more embodiments, the target users are members of a cluster whose membership score exceeds a predetermined percentage. In one or more embodiments, a target user may be physically proximate, as determined by a geographic position of the mobile device of the target user being within a threshold distance of a shopping zone of the locale in which the product is sold.

In one or more embodiments, the target users may include users who have demonstrated a proclivity to redeem promotions in the past. For example, the previous sales transactions of the user (e.g., obtained from a mobile application of the locale executing on the mobile device) may include data on promotions redeemed by the user.

In block 956, an impact of the promotion is predicted using metrics. In one or more embodiments, the impact of the promotion is predicted based on trends in the values calculated for various metrics when the promotion was previously deployed. The trends may be determined from historical values in the current locale or in a different locale. In particular, if the promotion is applied to a second locale having a threshold degree of similarity to the current first locale based on attributes (e.g., geographic region, type of locale, type of products at locale, size of locale, etc.) of the second locale and the current first locale, then the metrics for the promotion at the second locale may be used. For example, sales transactions (including information on redeemed promotions) obtained from sales logs of the locale may be correlated with geographic positions to calculate various metrics, such as the various metrics described above with reference to FIGS. 9A and 9B.

If, in block 958, the impact of the promotion is determined to be positive, then block 960 below is performed. Otherwise, if block 958 determines that the impact is not positive, then block 950 above is repeated, to select a different promotion.

If, in block 960, specific users are targeted for the promotion, then in block 962, the promotion is distributed to the targeted users. For example, the promotion may be distributed via email, text, via an alert in a mobile application executing on the mobile device, or using another transmission medium or combination thereof.

Otherwise, if block 960 determines that specific users are not targeted for the promotion, then in block 964, the promotion is distributed within the locale. For example, the promotion may be distributed using printed promotional materials, via audible announcements, via an alert in a mobile application executing on mobile devices in the vicinity of the locale, or using another technique.

In block 966, an actual impact of the promotion is measured using metrics. In one or more embodiments, the impact of the promotion is measured by calculating various metrics and comparing the values of the metrics to the predicted values of the metrics of block 956 above.

In block 968, corrective action is recommended to address any adverse operational impact of the promotion measured in block 966 above. For example, if the deployment of the promotion has resulted in longer lines and/or longer wait times at registers of the locale (see description of these metrics in block 904 above of FIG. 9A), additional registers may be placed in service. As another example, if the POS device sales logs indicate that a substantial number of manager overrides have been required to process the promotion, then more experienced cashiers may be deployed to the registers (e.g., and additional training arranged for cashiers lacking experience with the deployed promotion). As another example, if the POS device sales logs indicate a substantial number of failed attempts to redeem the promotion, then technical support may be alerted to investigate potential hardware and/or software problems in processing the promotion. Finally, if the operational impact substantially adversely deviates from the predicted impact (e.g., of block 956 above), then the promotion may be canceled, and block 950 above may be repeated to select a different promotion.

Figure 10A:
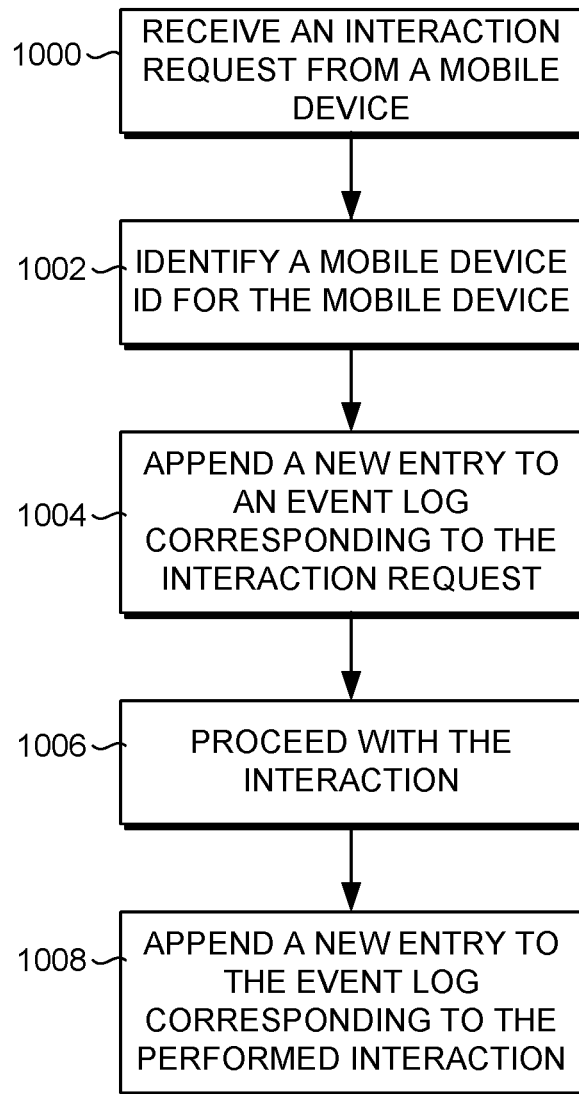

FIG. 10A shows a flowchart in accordance with one or more embodiments of the invention. In one or more embodiments, the process described in reference to FIG. 10A may be practiced using one or more components described in reference to FIG. 1, FIG. 2, FIG. 6, FIG. 7, FIG. 8A, FIG. 8B, FIG. 8C, and FIG. 8D (e.g., the geographic positioning analyzer (814) described in reference to FIG. 8A and FIG. 8D and the network device (808) described in reference to FIG. 8A and FIG. 8B). In one or more embodiments of the invention, one or more of the blocks shown in FIG. 10A may be omitted, repeated, and/or performed in parallel, or in a different order than the order shown in FIG. 10A. Accordingly, the scope of the invention should not be considered limited to the specific arrangement of blocks shown in FIG. 10A.

Initially, in block 1000, an interaction request is received from a mobile device. In one or more embodiments, the interaction request may be received by a network device. For example, the interaction request may be: a request to initiate a connection, a request to receive data, a request to send data, a request to terminate a connection, and/or any other request defined by a communication protocol.

In block 1002, a mobile device ID is identified for the mobile device. In one or more embodiments, the mobile device ID may be obtained from the interaction request (e.g., from a packet received from the mobile device that includes the interaction request). In one or more embodiments, the mobile device ID may be a MAC address of the mobile device. Alternatively, the mobile device ID may be any identifier that uniquely identifies the mobile device.

In block 1004, a new entry corresponding to the interaction request is appended to an event log. In one or more embodiments, the event log corresponds to the network device that received the interaction request in block 1000 above. In one or more embodiments, the new event log entry corresponding to the interaction request includes the mobile device ID, a timestamp, and the type of the interaction request. The new entry may be appended to the end of the event log for the network device.

In block 1006, the interaction proceeds. In one or more embodiments, the network device proceeds with the interaction by transmitting a message to the mobile device. For example, the message may include an acknowledgment of the interaction request and/or requested data, etc., in accordance with a protocol, and depending on the type of interaction requested.

In block 1008, a new entry corresponding to the performed interaction is appended to the event log. In one or more embodiments, the event log entry corresponding to the performed interaction includes the mobile device ID, a timestamp, and the type of the performed interaction. For example, the new entry may be appended to the end of the event log to denote success, completion, or failure of the interaction. Rather than each interaction having two entries in the event log, a single entry may be created for the start or end of the interaction.

Figure 10B:
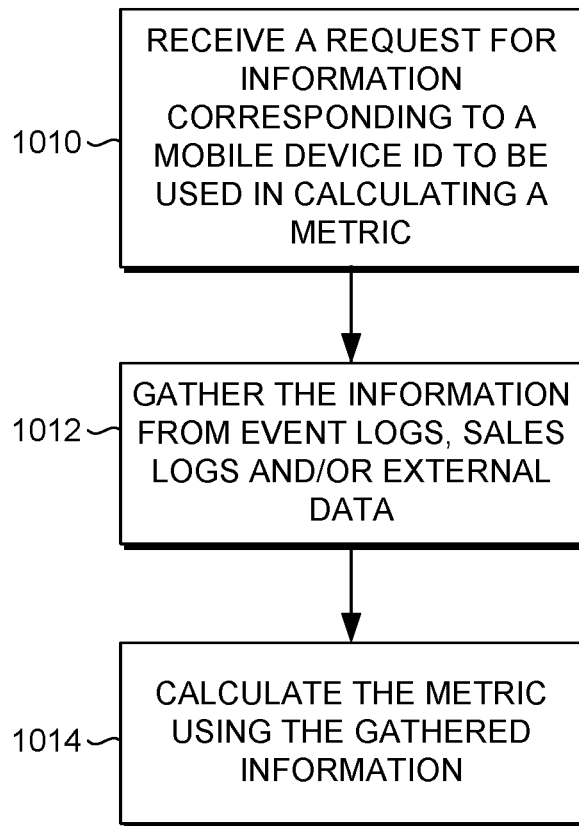

FIG. 10B shows a flowchart in accordance with one or more embodiments of the invention. In one or more embodiments, the process described in reference to FIG. 10B may be practiced using one or more components described in reference to FIG. 1, FIG. 2, FIG. 6, FIG. 7, FIG. 8A, FIG. 8B, FIG. 8C, and FIG. 8D (e.g., the geographic positioning analyzer (814) described in reference to FIG. 8A and FIG. 8D and the network device (808) described in reference to FIG. 8A and FIG. 8B). In one or more embodiments of the invention, one or more of the blocks shown in FIG. 10B may be omitted, repeated, and/or performed in parallel, or in a different order than the order shown in FIG. 10B. Accordingly, the scope of the invention should not be considered limited to the specific arrangement of blocks shown in FIG. 10B.

Initially, in block 1010, a request for information corresponding to a mobile device ID to be used in calculating a metric is received. In one or more embodiments, the request for information may be received by the geographic positioning analyzer. In one or more embodiments, the request for information may be received from an employee (e.g., a manager) of a locale. In one or more embodiments, the metric may be a metric discussed in the description of block 904 above in FIG. 9A. In one or more embodiments, the request for information may be sent during the execution of the processes described in FIG. 9A, FIG. 9B, FIG. 9C, and FIG. 9D.

In block 1012, information from event logs, sales logs and/or external data is gathered. As discussed in the descriptions of FIG. 9A, FIG. 9B, FIG. 9C, and FIG. 9D, information from event logs, sales logs and/or external data may be used in the calculation of various metrics that measure the performance of a locale (e.g., a retail store).

In block 1014, the metric is calculated using the information gathered in block 1012 above. Calculating the metric may be performed as discussed above in FIG. 9A, FIG. 9B, FIG. 9C, and FIG. 9D.

3.3. Examples

Figure 11:
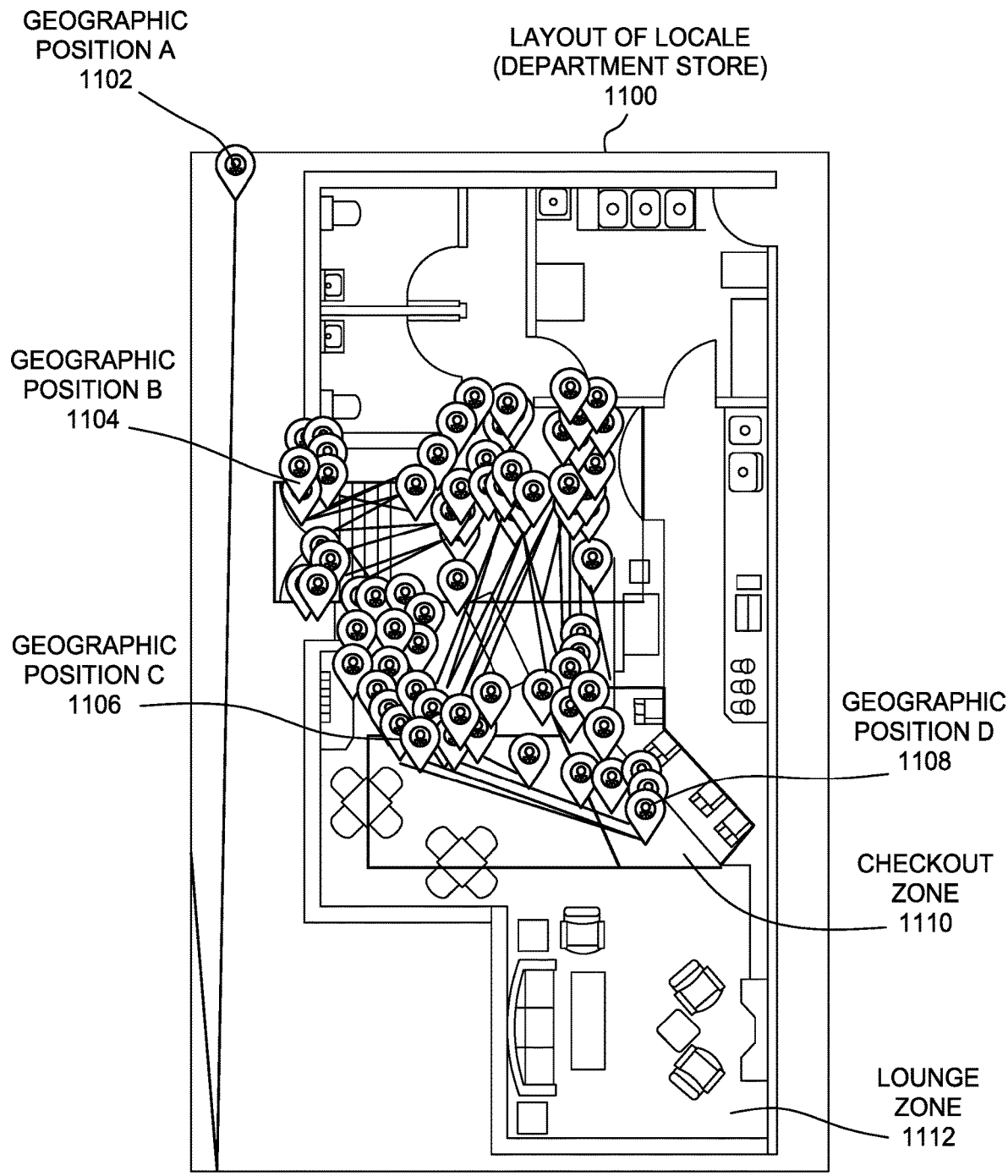
FIG. 11, FIG. 12A, and FIG. 12B show examples in accordance with one or more embodiments of the invention.

The following example is for explanatory purposes only and not intended to limit the scope of the invention. FIG. 11 shows an implementation example in accordance with one or more embodiments of the invention. FIG. 11 shows a layout of a locale (1100), in this case, a department store. FIG. 11 shows various geographic positions (1102, 1104, 1106, 1108) of a mobile device. Geographic position A (1102) is in an exterior (e.g., sidewalk) zone associated with the department store. Geographic position B (1104) is in an entrance zone associated with the department store. Geographic position C (1106) is in a shopping zone associated with the department store. Geographic position D (1108) is in a checkout zone (1110) where sales transactions are processed in the department store. FIG. 11 also illustrates a lounge zone (1112) of the department store.

Figure 12A:
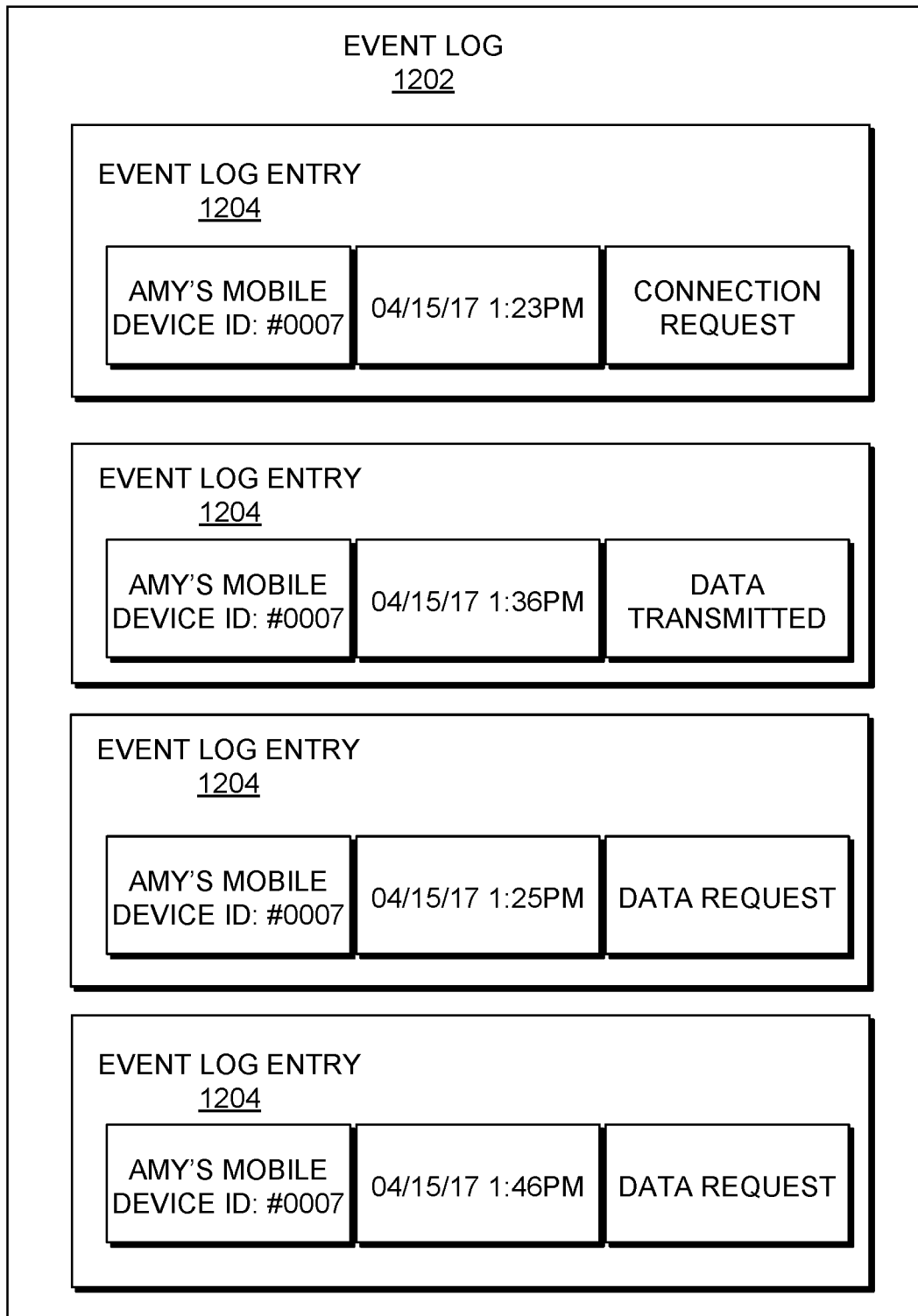
Figure 12B:
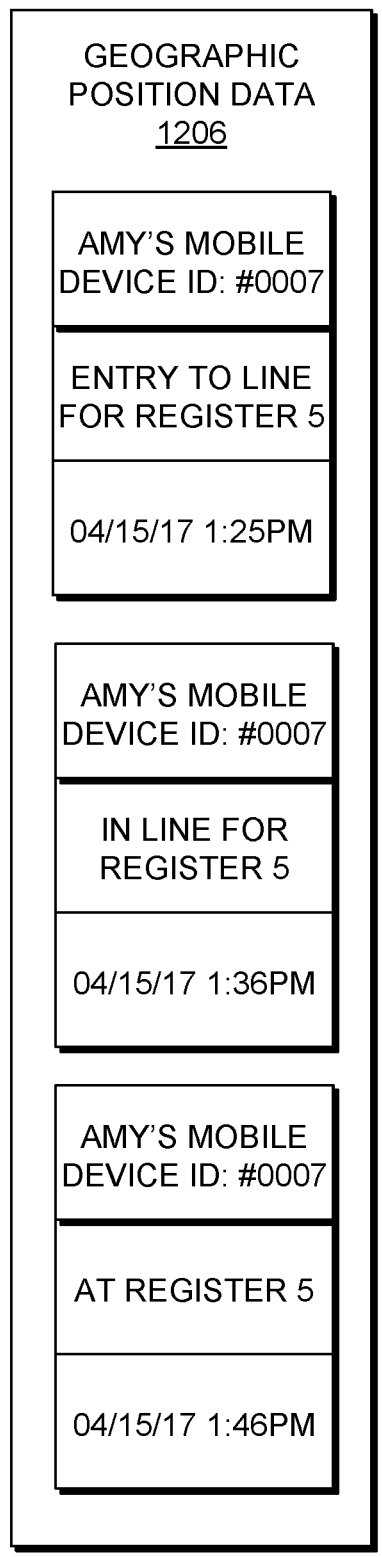

The following example is for explanatory purposes only and not intended to limit the scope of the invention. FIG. 12A and FIG. 12B show an implementation example in accordance with one or more embodiments of the invention.

As potential customers with mobile devices move within the vicinity of a department store (e.g., the department store shown in FIG. 11), various event logs (e.g., event log (1202)) track the interactions of the mobile devices with network devices on a network at the department store, as illustrated in FIG. 12A. There is a separate event log for each network device. Event log (1202) shows a series of interactions between a specific mobile device of a potential customer (Amy) and a specific wireless access point. Event log (1202) also includes interactions (not shown) between the mobile devices of other potential customers and the wireless access point. Each event log entry includes the mobile device ID of the mobile device, a timestamp, and an interaction type. The first event log entry in event log (1202) corresponds to a connection request from Amy's mobile device. This connection request occurred when Amy's mobile device initially moved within range of the wireless access point at geographic position A (1102) of FIG. 11. Successive event log entries in event log (1202) correspond to other interactions (e.g., requests to receive data, requests to send data, data transmissions, etc.) between Amy's mobile device and the wireless access point. These interactions occurred as Amy traveled within the locale (e.g., at geographic position B (1104), geographic position C (1106), and geographic position D (1108) of FIG. 11). Some of these interactions are initiated by the wireless access point (e.g., in order to periodically establish whether Amy's mobile device is still in the vicinity of the department store). FIG. 12A shows only the entries corresponding to Amy's mobile device for simplicity purposes. Each customer and each device of each customer that is in the department store may have several entries in the same event log. Further, because entries are appended to the event log, the several entries of other customers are interspersed in the entries for Amy's mobile device. By way of an example, if fifty customers are in a store and each has at least one mobile telephone then at least fifty to two hundred or more entries may be present in the event log in which Amy's mobile device is only a small subset.

The manager of the department store decides to run a report that evaluates the performance of the department store based on several metrics. The geographic position analyzer is executed to calculate the metrics selected by the manager. The manager selects a register wait time metric. The manager also selects a time interval, in this case the previous day. Alternatively, the manager may have selected the previous Monday as the time interval, based on the observation that metrics exhibit seasonality tied to specific days of the week and/or times of the day. The geographic position analyzer determines, using the event logs for various network devices, the geographic positions of various mobile devices in the vicinity of the locale during the selected time interval. The geographic position data (1206) corresponding to Amy's mobile device used to calculate the register wait time is illustrated in FIG. 12B. Based on the geographic positions of the mobile devices, the geographic position analyzer determines a wait time interval beginning when a mobile device reached a geographic position at a line at a register and ending when the mobile device reached the geographic position of the register. For example, the geographic position data (1206) corresponding to Amy's mobile device shows that Amy's mobile device entered the line for register 5 at 1:25 pm and reached register 5 at 1:46 pm. The register wait time metric is then calculated as an average of the lengths of the wait time intervals for different mobile devices. The geographic positions may be confirmed by correlating a timestamp at which the mobile device was at the geographic position of the register with a timestamp in a sales transaction extracted from a mobile application of the department store running on the mobile device (e.g., the mobile application includes a history of the sales transactions corresponding to the user of the mobile device).

Although satisfied with the overall performance of the department store regarding the various metrics, the manager of the department store then considers whether or not to run one or more promotions to improve sales. The geographic position analyzer is executed to predict the operational impact of various promotions selected by the manager. The manager selects a promotion that offers a free doughnut with a purchase of coffee. The impact of the promotion is predicted based on trends in the values calculated for various metrics (i.e., selected by the manager) in previous time intervals. Based on comparing the values of metrics in time intervals in which the promotion was deployed vs. the values of metrics in time intervals in which the promotion was not deployed, the geographic position analyzer predicts that deploying the promotion will increase the register wait time by fifteen percent (15%). Despite this prediction, the manager decides to run the promotion, but also authorizes the opening up of additional registers in an attempt to reduce the overall line size at each register. In addition, the manager assigns experienced cashiers to the additional registers to reduce the processing time of the promotions.

After the promotion has been running for a few hours, the manager of the department store decides to evaluate, using the geographic position analyzer, the actual operational impact of the promotion. Based on the value of the register wait time metric in the most recent time intervals (e.g., of the past few hours), the geographic position analyzer discovers that the register wait time is substantially higher than expected. In addition, based on comparing the value of a promotion processing time metric in previous time intervals vs. the value of the promotion processing time metric in the most recent time intervals, the geographic position analyzer discovers that the promotion processing time is substantially higher than expected. The increase in the promotion processing time metric also correlates with information from sales logs of POS devices at the registers, which indicate an increase in manager overrides and failures associated with the promotion. In addition, the increase in the promotion processing time metric also correlates with the geographic positions of mobile devices remaining in the vicinity of the geographic position of the register for extended time intervals. The manager then suspends the deployment of the promotion, and alerts the technical support team to investigate potential hardware or software problems causing difficulty with the processing the promotion.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    accessing a plurality of events in a field-searchable data store, the plurality of events comprising raw machine data associated with a timestamp, the raw machine data representing a plurality of interactions between a mobile device and at least one network device at a locale;
    determining, based on the plurality of interactions, at least one geographic position of the mobile device;
    calculating a metric for the locale using the at least one geographic position;
    obtaining a plurality of completed sales transactions from a point of sale (POS) device at the locale;
    determining, using the plurality of events and based on the at least one geographic position being within a predetermined threshold of the POS device for at least a predetermined amount of time, that at least one completed sales transaction is performed;
    correlating the at least one completed sales transaction with the plurality of completed sales transactions from the POS device to obtain at least one confirmed transaction; and
    determining, in response to the correlating, an impact on the metric by a promotion comprising a discount used in the at least one confirmed transaction.

2. The method of claim 1,
    wherein the metric is a wait time in a line at a register at the locale.

3. The method of claim 1, further comprising:
    obtaining, in response to the correlating, at least one correlation comprising a first correlation of a first geographic position and a first time interval;
    identifying the first correlation as an anomaly; and
    excluding, in response to identifying the first correlation as an anomaly, the first correlation from the at least one correlation.

4. The method of claim 1,
    wherein the metric is a walk-by conversion rate at the locale.

5. The method of claim 1, further comprising:
    predicting, using the impact on the metric, a value of the metric in a periodic time interval using a trend in previous values of the metric in the periodic time interval.

6. The method of claim 1, further comprising:
    predicting, using the impact on the metric, a value of the metric in a periodic time interval using a trend in previous values of the metric in the periodic time interval; and
    adjusting, in response to predicting the value of the metric, an operating parameter of the locale.

7. The method of claim 1, further comprising:
    obtaining sensor data from at least one sensor at the locale; and
    correlating the at least one geographic position and at least one time interval determined from the plurality of interactions with the sensor data.

8. The method of claim 1, further comprising:
    obtaining sensor data from at least one sensor at the locale; and
    correlating the at least one geographic position and at least one time interval determined from the plurality of interactions with the sensor data, wherein the metric is a spike in a size of walk-by traffic at the locale.

9. The method of claim 1, wherein the at least one network device comprises a wireless access point.

10. The method of claim 1, wherein the plurality of interactions comprises a request from the mobile device to connect to a network at the locale via the at least one network device.

11. A computer system, comprising:
    a field-searchable data store comprising a plurality of events comprising raw machine data associated with a timestamp, the raw machine data representing a plurality of interactions between a mobile device and at least one network device at a locale; and
    circuitry configured to:
        access the plurality of events;
        determine, based on the plurality of interactions, at least one geographic position of the mobile device;
        calculate a metric for the locale using the at least one geographic position;
        obtain a plurality of completed sales transactions from a point of sale (POS) device at the locale;
        determine, using the plurality of events and based on the at least one geographic position being within a predetermined threshold of the POS device for at least a predetermined amount of time, that at least one completed sales transaction is performed;
        correlate the at least one completed sales transaction with the plurality of completed sales transactions from the POS device to obtain at least one confirmed transaction; and
        determine, in response to the correlating, an impact on the metric by a promotion comprising a discount used in the at least one confirmed transaction.

12. The system of claim 11, wherein the circuitry is further configured to:
    obtain, in response to the correlating, at least one correlation, the at least one correlation comprising a first correlation of a first geographic position and a first time interval;
    identify the first correlation as an anomaly; and
    exclude, in response to identifying the first correlation as an anomaly, the first correlation from the at least one correlation.

13. The system of claim 11, wherein the circuitry is further configured to:

predict, using the impact on the metric, a value of the metric in a periodic time interval using a trend in previous values of the metric in the periodic time interval.

14. The system of claim 11, wherein the circuitry is further configured to:

obtain sensor data from at least one sensor at the locale; and correlate the at least one geographic position and at least one time interval determined from the plurality of interactions with the sensor data.

15. The system of claim 11, wherein the at least one network device comprises a wireless access point.

16. The system of claim 11, wherein the plurality of interactions comprises a request from the mobile device to connect to a network at the locale via the at least one network device.

17. A non-transitory computer-readable medium comprising instructions, execution of which in a computer system causes the computer system to:

access a plurality of events in a field-searchable data store, the plurality of events comprising raw machine data associated with a timestamp, the raw machine data representing a plurality of interactions between a mobile device and at least one network device at a locale;

determine, based on the plurality of interactions, at least one geographic position of the mobile device;

calculate a metric for the locale using the at least one geographic position;

obtain a plurality of completed sales transactions from a point of sale (POS) device at the locale;

determine, using the plurality of events and based on the at least one geographic position being within a predetermined threshold of the POS device for at least a predetermined amount of time, that at least one completed sales transaction is performed;

correlate the at least one completed sales transaction with the plurality of completed sales transactions from the POS device to obtain at least one confirmed transaction; and determine, in response to the correlating, an impact on the metric by a promotion comprising a discount used in the at least one confirmed transaction.

18. The non-transitory computer-readable medium of claim 17, wherein the instructions, upon execution, further cause the computer system to:

predict, using the impact on the metric, a value of the metric in a periodic time interval using a trend in previous values of the metric in the periodic time interval.

19. The non-transitory computer-readable medium of claim 17, wherein the instructions, upon execution, further cause the computer system to:

obtain sensor data from at least one sensor at the locale; and correlate the at least one geographic position and at least one time interval determined from the plurality of interactions with the sensor data.

20. The non-transitory computer-readable medium of claim 17, wherein the at least one network device comprises a wireless access point.

* * * * *